US010759960B2

(12) United States Patent
Jingu et al.

(10) Patent No.: US 10,759,960 B2
(45) Date of Patent: Sep. 1, 2020

(54) HEATING—AND LIGHT-CURABLE COATING COMPOSITION AND COATING FILM FORMATION METHOD, WATER PRESSURE TRANSFER METHOD

(71) Applicants: Origin Electric Company, Limited, Saitama (JP); TAICA CORPORATION, Tokyo (JP)

(72) Inventors: Tomoyuki Jingu, Saitama (JP); Wataru Ikeda, Tokyo (JP); Kazutoshi Toda, Tokyo (JP); Akiko Tomiki, Tokyo (JP)

(73) Assignees: ORIGIN ELECTRIC COMPANY, LIMITED, Saitama (JP); TAICA CORPORATION, Yokyo (JP)

( * ) Notice: Subject to any disclaimer, the term of this patent is extended or adjusted under 35 U.S.C. 154(b) by 0 days.

(21) Appl. No.: 15/501,289

(22) PCT Filed: Aug. 5, 2014

(86) PCT No.: PCT/JP2014/070560
§ 371 (c)(1),
(2) Date: Feb. 2, 2017

(87) PCT Pub. No.: WO2016/020978
PCT Pub. Date: Feb. 11, 2016

(65) Prior Publication Data
US 2017/0218220 A1    Aug. 3, 2017

(51) Int. Cl.
*C09D 133/12* (2006.01)
*C09D 133/14* (2006.01)
(Continued)

(52) U.S. Cl.
CPC ............ *C09D 133/12* (2013.01); *B44C 1/175* (2013.01); *B44C 1/1758* (2013.01);
(Continued)

(58) Field of Classification Search
CPC .. C09D 133/12; C09D 175/16; C09D 133/06; C09D 133/08; C09D 175/14;
(Continued)

(56) References Cited

U.S. PATENT DOCUMENTS

2007/0054977 A1    3/2007 Sugiura et al.

FOREIGN PATENT DOCUMENTS

| CN | 100424144 C | 10/2008 |
| CN | 102649895 A | 8/2012 |

(Continued)

OTHER PUBLICATIONS

Japanese Patent Office, "International Search Report" in connection with related International Application No. PCT/JP2014/070560, dated Apr. 21, 2015, 4 pages.
(Continued)

*Primary Examiner* — Jessica M Roswell
(74) *Attorney, Agent, or Firm* — Kolisch Hartwell, P.C.

(57) ABSTRACT

The present invention provides: a heat- and light-curable coating composition which is suitable as a top clear coat for plastic molded articles for automobiles or household electric appliances or for plastic molded articles having a water pressure transfer print layer; a coating film formation method using the coating composition; and a water pressure transfer method using the coating composition. The heat- and light-curable coating composition comprises: an acrylic polyol resin (a) having a glass transition temperature (Tg) of 50° C. to 100° C., a mass average molecular weight of 1,000 to 20,000, and a hydroxyl value of 20 to 200 mgKOH/g; a multifunctional photocurable compound (b); a polymerization initiator (c); and a polyisocyanate compound (d), wherein a ratio of the acrylic polyol resin to the multifunctional photocurable compound is 5/95 to 90/10, and an equivalence ratio of hydroxyl groups contained in the acrylic (Continued)

polyol resin to isocyanate groups contained in the polyisocyanate compound, (OH/NCO), is 0.5 to 1.5.

17 Claims, 2 Drawing Sheets

(51) Int. Cl.
*B44C 1/17* (2006.01)
*C08G 18/79* (2006.01)
*C09D 4/00* (2006.01)
*B44C 1/175* (2006.01)
*C08G 18/62* (2006.01)
*C08G 18/08* (2006.01)
*C09D 133/06* (2006.01)
*C09D 175/16* (2006.01)
*C09D 4/06* (2006.01)
*C09D 133/08* (2006.01)
*C09D 175/14* (2006.01)

(52) U.S. Cl.
CPC ..... *C08G 18/0842* (2013.01); *C08G 18/6225* (2013.01); *C08G 18/792* (2013.01); *C09D 4/06* (2013.01); *C09D 133/06* (2013.01); *C09D 133/08* (2013.01); *C09D 133/14* (2013.01); *C09D 175/14* (2013.01); *C09D 175/16* (2013.01); *C08L 2312/00* (2013.01)

(58) Field of Classification Search
CPC .... C09D 133/14; C09D 4/00; C08G 18/6225; C08G 18/792; C08G 18/0842; C08F 290/147; B44C 1/1758; B44C 1/175; C08L 2312/00

See application file for complete search history.

(56) References Cited

FOREIGN PATENT DOCUMENTS

| JP | 05125145 A | 5/1993 | |
|----|---|---|---|
| JP | 08311398 A | 11/1996 | |
| JP | 2008080633 A | 4/2008 | |
| JP | 2010179256 A | 8/2010 | |
| JP | 2012162616 A | 8/2012 | |
| JP | 2013-213173 | * 10/2013 | ........... C09D 133/14 |
| JP | 2013203830 A | 10/2013 | |
| JP | 2013213173 A | 10/2013 | |
| WO | 2005030890 A1 | 4/2005 | |

OTHER PUBLICATIONS

Japanese Patent Office, "Notice of Reasons for Rejection" in connection with related Japanese Patent Application No. 2015-244546, dated Mar. 7, 2016, 6 pages.

The State Intellectual Property Office of China, "First Office Action" in connection with related Chinese Patent Application No. 201480080939.1, dated Jun. 14, 2018, 17 pgs.

* cited by examiner

HEATING—AND LIGHT-CURABLE COATING COMPOSITION AND COATING FILM FORMATION METHOD, WATER PRESSURE TRANSFER METHOD

TECHNICAL FIELD

The present invention relates to a heat- and light-curable coating composition and a coating film formation method using the coating composition. Particularly, the present invention relates to a heat- and light-curable coating composition for surface protection of or imparting aesthetic appearance to plastic molded articles having a pre-formed coating layer formed by plating, vapor deposition or painting, or plastic molded articles having a water pressure transfer print layer which is a decorative layer formed by water pressure transfer; a coating film formation method using the coating composition; and a water pressure transfer method using the coating composition.

DESCRIPTION OF RELATED ART

In automobile parts and the like, the water pressure transfer method is used for decorating the surfaces of plastic molded articles having complicated three-dimensional surfaces. The water pressure transfer method is a method of forming a decorative layer, in which a water pressure transfer film having a water-insoluble print pattern layer formed on a water-soluble film is floated on the surface of water contained in a transfer tank so as to cause the water-soluble film to be wet with water; and a molded article is pushed into the water in the transfer tank while being in contact with the print pattern layer, whereby the print pattern layer is transferred onto the surface of the molded article utilizing a water pressure exerted against the surface of the molded article (transfer substrate). In general, a water pressure transfer film is stored in a state of being wound into a roll with a print pattern layer (i.e., a print pattern printed on a water-soluble film) being dried; therefore, the ink of the print pattern layer is in a dry state without adhesiveness. For this reason, before carrying out the water pressure transfer, it is necessary to bring the print pattern layer on the water pressure transfer film back to the same wet state as immediately after the printing by applying a solvent such as an activator or a thinner. This process is generally referred to as "activation process". The decorative layer formed on the surface of the molded article by such water pressure transfer method is insufficient in respect of scratch resistance, chemical resistance, environment resistance, etc. Therefore, it is necessary to protect the surface of the decorative layer mechanically and chemically by forming a protective film on the decorative layer. Further, the protective film is required to strongly adhere to both the decorative layer and the molded article surface and not to get peeled.

Ultraviolet curable paints or two-pack reaction type urethane paints are used for forming a coating film intended for surface protection of or imparting aesthetic appearance to automobile bodies or plastic parts for automobiles or household electric appliances. However, the ultraviolet curable paint forms a very hard coating film which cannot follow the shrinkage of a curing film (coating layer) formed by further applying a paint on the pre-formed coating film, which causes a problem of delamination between the pre-formed coating film and the later-formed coating film (recoat coating film) which is cured on the pre-formed coating film. In the case of the two-pack reaction type urethane paint, a long time is needed for the step of drying the paint, which causes a problem that the packaging cannot be done within a short period of time after the film formation (that is, "packageability" is poor), resulting in poor productivity and raising the production cost. In addition, when the two-pack reaction type urethane paint is prepared into a high-gloss coating composition capable of realizing good appearance, the resulting coating film is inferior in respect of scratch resistance. The packageability means a property that a coated product can be packaged and transported within a short period of time after a coating film is formed on the product by curing a coating composition. In the case of a coated product having good packageability, the coating film is sufficiently cured within a short period of time after a coating film is formed by subjecting a coating layer to curing treatment such as heating or ultraviolet irradiation; therefore, even when the coated product with the coating film formed thereon is packaged with a packaging material and transported, the coated product is free from defects such as marks of the packaging material left on the surface of the coating film, migration of chemicals etc. (e.g., additives) exuded from the packaging material to the coating film, and scratches occurring during the transportation.

As described above, paints used for the purpose of surface protection or imparting aesthetic appearance are required to excel both in terms of quality and productivity. Faced with problems, there is proposed a paint (dual cure paint) that cures in a short period of time by heating reaction of a polyol compound with a polyisocyanate compound as a curing agent and curing a photocurable oligomer by ultraviolet rays (see, for example, Patent Documents 1 and 2).

The paint proposed in Patent Document 1 is for surface processing of woodworking products. In order to obtain a coating film that excels in hardness, adhesiveness and resistance to repeated cold/heat cycle, the coating composition disclosed in Patent Document 1 is prepared by: mixing a (meth) acrylic acid ester of an epoxy compound having a reactive hydroxyl group and a photoreactive acryloyl group with a flexible acrylic polyol (glass transition temperature: 30 to 70° C., number average molecular weight (Mn): 1,000 to 15,000) in a good balance; mixing thereinto a photopolymerizable monomer to further improve the curability of the coating film; and blending the resulting mixture with a photopolymerization initiator and a polyisocyanate compound. However, a coating film obtained from this coating composition cannot be used as a protective film to be formed on a decorative layer of a water pressure transfer article having an elaborate design such as replication of a real wood, because such a coating film is inferior in chemical resistance such as oleic acid resistance, lactic acid resistance, and sunscreen cream resistance.

The paint proposed in Patent Document 2 is intended for a top coat layer. In order to obtain a coating film that excels in water resistance, weather resistance and curability, the coating composition disclosed in Patent Document 2 is obtained by blending a hydroxyl group-containing resin, an ultraviolet curable compound having an unsaturated bond, and a polyisocyanate compound. In this coating composition, the glass transition temperature of the hydroxyl group-containing resin is adjusted to −20 to 50° C. for preventing the polyisocyanate compound from permeating into the base coat layer even after crosslinking chains of the ultraviolet curable compound are formed in the topcoat layer. However, there is a room for improvement of the cured coating film of Patent Document 2 in that the cured coating film is inferior in chemical resistance such as oleic acid resistance, lactic acid resistance and sunscreen cream resistance as in the case of the coating film disclosed in Patent Document 1, and also inferior in packageability.

As far as the conventional paints as described above are concerned, the resistance to human sebum and perspiration (chemical resistance) has not been sufficiently studied. Therefore, the fact is that a paint has not conventionally been available which simultaneously satisfies the required packageability and chemical resistance when used as a paint for forming a protective film on the surface of parts of automobiles or household electrical appliances which are required to excel both in quality and productivity, especially an article having a decorative layer formed by the water pressure transfer method. In addition, the decorative layer formed by the water pressure transfer method has poor adhesion to the transfer substrate and, hence, it is required to improve the adhesion between the decorative layer and the transfer substrate, and it is also required to simultaneously satisfy various performance requirements with respect to appearance such as gloss, scratch resistance, environmental resistance (e.g., water resistance and moisture resistance) and the like.

DOCUMENTS OF RELATED ART

Patent Document

Patent Document 1: Japanese Unexamined Patent Application, First Publication No. Hei 5-125145
Patent Document 2: Japanese Unexamined Patent Application Publication No. 2010-179256

SUMMARY OF THE INVENTION

Problems to be Solved by the Invention

The object of the present invention is to provide: a heat- and light-curable coating composition which is suitable as a top clear coat for plastic molded articles for automobiles or household electric appliances or for plastic molded articles having a water pressure transfer print layer and which is capable of forming a coating film excellent not only in appearance (gloss, smoothness, thick appearance, etc.), chemical resistance, scratch resistance, recoatability and environmental resistance (water resistance, moisture resistance, etc.), but also in curability at the time of forming a protective film and adhesiveness to plastic molded articles; a coating film formation method using the coating composition; and a water pressure transfer method using the coating composition.

Means to Solve the Problems

The present inventors have made studies in order to solve the aforementioned problems. As a result, they have found that a coating composition containing specific types of acrylic polyol resin, multifunctional photocurable compound and polyisocyanate compound in a specific ratio has two curing mechanisms that can be activated simultaneously, i.e., a curing through the formation of urethane bonds between the acrylic polyol resin and the polyisocyanate compound, and a curing through a radical polymerization reaction of the photocurable compound with a photopolymerization initiator; and that a high drying speed after coating and an excellent curability are exhibited by a protective film formed by applying the aforementioned coating composition to a water pressure transfer print layer (hereinafter sometimes referred to as "decorative layer") formed by water pressure transfer of a print pattern layer of a water pressure transfer film to the surface of a molded article and curing the coating composition by heating and ultraviolet irradiation, namely, the "packageability" is excellent; that a protective layer excellent in appearance (gloss etc.) can be formed without impairing the design of the decorative layer; that the protective layer is excellent in chemical resistance; that the protective layer is excellent in recoatability; that the protective layer is excellent in scratch resistance; that the protective layer is excellent in environmental resistance (water resistance, moisture resistance, etc.); and that the protective film has excellent adhesion to the decorative layer as well. Further, the present inventors have also found that the same effects as described above are exhibited even when the coating composition is applied to an uncoated plastic molded article or a coated plastic molded article having a coating layer. The present invention has been completed based on these findings.

In the present specification, the aforementioned chemical resistance means resistance to human sebum and perspiration, and specifically indicates "oleic acid resistance", "lactic acid resistance", and "sunscreen cream resistance". Hereinafter, the term "chemical resistance" means these three types of performances.

Specifically, the present invention provides a heat- and light-curable coating composition for water pressure transfer, which is for protecting a decorative layer formed on a surface of a transfer substrate by water pressure transfer of a print pattern layer printed and dried on a water soluble film and for protecting the surface of said transfer substrate, which comprises:
an acrylic polyol resin (a), a multifunctional photocurable compound (b), a photopolymerization initiator (c), and a polyisocyanate compound (d),
said acrylic polyol resin (a) having a glass transition temperature (Tg) of 50° C. to 100° C., a mass average molecular weight of 1,000 to 20,000 in terms of polystyrene, and a hydroxyl value of 20 to 200 mgKOH/g,
said multifunctional photocurable compound (b) being a compound having two or more polymerizable unsaturated bonds per molecule,
a ratio of said acrylic polyol resin (a) to said multifunctional photocurable compound (b) being 50/50 to 70/30 in terms of a mass ratio (a)/(b), and
an equivalence ratio of hydroxyl groups (—OH) contained in the acrylic polyol resin (a) to isocyanate groups (—NCO) contained in the polyisocyanate compound (d), (OH/NCO), is 0.5 to 1.5.

Further, the present invention provides a heat- and light-curable coating composition comprises an acrylic polyol resin (a), a multifunctional photocurable compound (b), a photopolymerization initiator (c), and a polyisocyanate compound (d),
said acrylic polyol resin (a) having a glass transition temperature (Tg) of 50° C. to 100° C., a mass average molecular weight of 1,000 to 20,000 in terms of polystyrene, and a hydroxyl value of 20 to 200 mgKOH/g,
said multifunctional photocurable compound (b) being a compound having two or more polymerizable unsaturated bonds per molecule,
a ratio of said acrylic polyol resin (a) to said multifunctional photocurable compound (b) being 5/95 to 90/10 in terms of a mass ratio (a)/(b), and an equivalence ratio of hydroxyl groups (—OH) contained in the acrylic polyol resin (a) to isocyanate groups (—NCO) contained in the polyisocyanate compound (d), (OH/NCO), is 0.5 to 1.5.

The present invention also provides a water pressure transfer method comprising forming a decorative layer by water pressure transfer of a print pattern layer of a water pressure transfer film having said print pattern layer printed and dried on a water soluble film to a surface of a transfer substrate, followed by coating and curing a heat- and light-curable coating composition for water pressure transfer on the decorative layer to form a protective film, the heat- and light-curable coating composition comprises an acrylic polyol resin (a), a multifunctional photocurable compound (b), a photopolymerization initiator (c), and a polyisocyanate compound (d), said acrylic polyol resin (a) having a glass transition temperature (Tg) of 50° C. to 100° C., a weight average molecular weight of 1,000 to 20,000 in terms of polystyrene, and a hydroxyl value of 20 to 200 mgKOH/g, said multifunctional photocurable compound (b) being a compound having two or more polymerizable unsaturated bonds per molecule, a ratio of said acrylic polyol resin (a) to said multifunctional photocurable compound (b) being 50/50 to 70/30 in terms of a mass ratio (a)/(b), and an equivalence ratio of hydroxyl groups (—OH) contained in the acrylic polyol resin (a) to isocyanate groups (—NCO) contained in the polyisocyanate compound (d), (OH/NCO), is 0.5 to 1.5.

Further, the present invention also provides a coating film forming method comprising: applying the heat- and light-curable coating composition of the present invention on: (i) a surface of a plastic molded article, or (ii) a surface of a coated plastic molded article having a pre-formed coating layer formed by treating a surface of the plastic molded article by plating, vapor deposition or painting, thereby forming a coating layer; heating and drying the coating layer; and curing the heated and dried coating film by ultraviolet irradiation.

Furthermore, the present invention also provides an article obtained by the coating film forming method of the present invention, and a water pressure transfer article obtained by the water pressure transfer method of the present invention.

Effect of the Invention

A coating film formed from the heat- and light-curable coating composition of the present invention exhibits high adhesion to the surface of an article or a decorative layer, and is excellent in appearance (gloss, etc.), scratch resistance, environmental resistance (water resistance, moisture resistance, etc.), which hence is suitable as a protective layer for water pressure transfer. In addition, the heat- and light-curable coating composition of the present invention has excellent permeability to a decorative layer formed by water pressure transfer, and hence is excellent in adhesion between the article (transfer substrate) after curing of the composition and the decorative layer, whereby it is possible to realize excellent design and durability even in automobile applications on which especially strict quality requirements are imposed.

Likewise, a coating film formed from the heat- and light-curable coating composition of the present invention is excellent in adhesion to the surface of a plastic article or a layer formed on the surface of the plastic article, appearance (gloss, etc.), scratch resistance and chemical resistance, and hence is especially suitable as a top clear coat for automobiles or household electric appliances on which especially strict quality requirements are imposed.

Further, the heat- and light-curable coating composition of the present invention has excellent recoatability. Furthermore, the coating composition exhibits high curability at the time of forming a coating film; therefore, an article coated with the coating composition can be packaged within a short period of time after the film formation (that is, packageability is good), thereby contributing to shortening of the production process.

According to the coating film forming method and the water pressure transfer method of the present invention, the curability at the time of forming the protective film is high and the packaging can be carried out within a short period of time after the film formation, whereby the production efficiency of parts for automobiles and household electric appliances can be dramatically improved.

DESCRIPTION OF THE EMBODIMENTS

Figure 1:
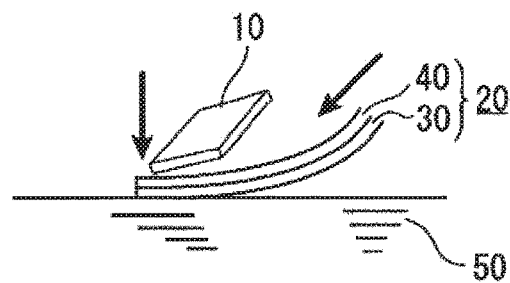
FIG. 1 is a schematic view showing the transfer method using the coating composition for water pressure transfer of the present invention.

Each of the heat- and light-curable coating composition (hereinafter, abbreviated as "coating composition") and the heat- and light-curable coating composition for water pressure transfer (hereinafter, abbreviated as "water pressure transfer coating composition") comprises specific types of acrylic polyol resin (a), multifunctional photocurable compound (b), photopolymerization initiator (c), and polyisocyanate compound (d) which are blended in a specific ratio. These coating compositions have in common a function that a protective film is formed by curing, with heat and light, a coating layer formed by applying the coating composition.

The aforementioned coating composition is used for protecting a surface of a plastic molded article or a surface of a coated plastic molded article having a pre-formed coating layer formed by treating a plastic surface of the plastic molded article by plating, vapor deposition or painting.

The aforementioned water pressure transfer coating composition is used for protecting a decorative layer formed on a surface of a transfer substrate by water pressure transfer of a print pattern layer printed and dried on a water soluble film and for protecting the surface of said transfer substrate.

First, the coating composition of the present invention will be described in detail.

(Acrylic Polyol Resin)

The acrylic polyol resin (a) used in the coating composition of the present invention has a glass transition temperature (Tg) of 50° C. to 100° C., preferably 55° C. to 90° C., and especially preferably 55° C. to 80° C. When the glass transition temperature is 50° C. or higher, the resulting protective film can be imparted with desired hardness and scratch resistance. On the other hand, when the glass transition temperature exceeds 100° C., the resulting protective film tends to become inferior in gloss, smoothness and thick appearance, thereby impairing the excellence in appearance. The term "thick appearance" means that the film is full and plump in thickness and indeed appears to be a thick film.

The glass transition temperature (Tg) of the acrylic polyol resin can be determined by the following formula in the case where the resin is a copolymer composed of various kinds of monomers.

$$\frac{1}{Tg} = \frac{W_1}{Tg_1} + \frac{W_2}{Tg_2} \ldots + \frac{W_n}{Tg_n}$$

wherein $Tg_1, Tg_2 \ldots, Tg_n$: Tg of each homopolymer (K), and $W_1, W_2 \ldots W_n$: % by mass of each monomer The acrylic polyol resin (a) has a mass average molecular weight of 1,000 to 20,000, preferably 4,000 to 10,000, and more preferably 4,000 to 8,000. When the mass average molecular weight is 1,000 or more, the chemical resistance of the protective film can be satisfactorily improved and the object of the present invention can be achieved. On the other hand, when the mass average molecular weight is less than 1,000, the chemical resistance of the protective film becomes inferior, which is not favorable. Further, when the mass average molecular weight is 20,000 or less, the curing shrinkage upon curing of the coating layer is small, so that it is possible to form a protective film excellent in design without impairing gloss and smoothness of the protective film. The mass average molecular weight is a value determined by gel permeation chromatography (GPC) and calibration with polystyrene standards.

The acrylic polyol resin (a) has a hydroxyl value of 20 to 200 mgKOH/g, preferably 20 to 150 mgKOH/g, and more preferably 50 to 110 mgKOH/g. When the hydroxyl value is 20 mg-KOH/g or more, a crosslinking occurs through reaction with the polyisocyanate compound described later, whereby a protective film having excellent abrasion resistance and the like can be formed. When the hydroxyl value is 200 mg-KOH/g or less, the degree of crosslinking does not become excessive, and a protective film excellent in adhesion to the decorative layer and the surface of the plastic molded article can be formed. In consideration of the balance between the quality (abrasion resistance, solvent resistance, appearance, etc.) and the productivity (packageability, etc.) of the protective film, the especially preferable range of hydroxyl value is 50 to 80 mg-KOH/g. The hydroxyl value is a value measured according to JIS K 1557-1.

The hydroxyl value is a parameter indicating the hydroxyl group content of a sample, and is measured in terms of an amount of potassium hydroxide (mg relative to 1.0 g of a sample) required for neutralizing acetic acid required for acetylation of the hydroxyl groups (—OH) in the sample. For the acetylation, various reagents can be used, but pyridine and acetic anhydride (3:1) are generally used, and the measurement is performed by titration to determine the difference in acid concentration before and after the acetylation.

The acrylic polyol resin having a glass transition temperature within the aforementioned preferred range can be obtained by copolymerizing a hydroxyl group-containing acrylic monomer (a1) having at least one hydroxyl group and at least one polymerizable unsaturated bond per molecule thereof with the other monomer (a2).

Examples of the hydroxyl group-containing acrylic monomer (a1) include a monoester of a glycol having 2 to 4 carbon atoms with (meth)acrylic acid, such as hydroxyethyl (meth)acrylate, hydroxypropyl (meth)acrylate and hydroxybutyl (meth)acrylate; a lactone-modified hydroxyethyl (meth)acrylate; a polyoxyalkylene-modified hydroxyethyl (meth)acrylate, such as a polyoxyethylene-modified hydroxyethyl (meth)acrylate, and a polyoxypropylene-modified hydroxyethyl (meth)acrylate. The term "(meth) acrylic acid" means acrylic acid or methacrylic acid.

The other monomer (a2) is preferably a monomer selected from the group consisting of an acrylic monomer and a styrenic monomer, each having a polymerizable unsaturated bond and having no hydroxyl group. With respect to these monomers, one of the monomers may be used alone, or two or more of the monomers may be used in combination.

Examples of the acrylic monomer include C1-C22 alkyl ester of (meth)acrylic acid, where the alkyl moiety preferably has 1 to 12 carbon atoms, and more preferably 1 to 8 carbon atoms; C2-C18 alkoxyalkyl esters of (meth)acrylic acid, where the alkoxyalkyl moiety preferably has 2 to 4 carbon atoms; amino (meth)acrylic monomers; (meth)acrylamide monomers; epoxy group-containing monomers; and carboxyl group-containing monomers. Examples of the styrenic monomer include styrene, and α-methylstyrene.

Examples of the $C_1$-$C_{22}$ alkyl ester of (meth)acrylic acid include methyl (meth)acrylate, ethyl (meth)acrylate, propyl (meth)acrylate, butyl (meth)acrylate, hexyl (meth)acrylate, octyl (meth)acrylate, lauryl (meth)acrylate, 2-ethylhexyl (meth)acrylate, cyclohexyl (meth)acrylate, and isobornyl (meth)acrylate.

Examples of $C_2$-$C_{18}$ alkoxyalkyl esters of (meth)acrylic acid include methoxybutyl (meth)acrylate, and methoxyethyl (meth)acrylate.

Examples of the amino (meth)acrylic monomer include N,N-dimethylaminoethyl (meth)acrylate, N,N-diethylaminoethyl (meth)acrylate, N-t-butylaminoethyl (meth)acrylate, and N,N-dimethylaminopropyl (meth)acrylate.

Examples of the (meth)acrylamide monomers include acrylamide, methacrylamide, N-methylacrylamide, N-methylmethacrylamide, N-ethylacrylamide, N-ethylmethacrylamide, N-butylacrylamide, N-butylmethacrylamide, N,N-dimethylacrylamide, and N, N-dimethylmethacrylamide.

Examples of the epoxy group-containing monomer include glycidyl (meth)acrylate, and the examples of the carboxyl group-containing monomer include acrylic acid and methacrylic acid.

The acrylic polyol resin can be produced by a known polymerization method, and the solution polymerization method is preferable from the viewpoint of production efficiency. The solution polymerization method can be performed, for example, by dissolving the monomer components in an organic solvent, followed by heating at 60 to 180° C. in a nitrogen atmosphere in the presence of a polymerization initiator while stirring. The polymerization time is generally 1 to 10 hours. Examples of the organic solvent include ketone solvents, ester solvents, and hydrocarbon solvents. Examples of the polymerization initiator include peroxides and azo compounds. From the viewpoint of the pot life of the coating composition, it is preferable that the polymerized acrylic polyol resin is adjusted to have a pH in the range of 6 to 8. An amine compound is preferably used as a pH adjuster. The term "pot life" refers to the maximum time period during which a mixture of several paint components supplied separately remains usable as a paint. After expiration of the pot life, the progress of gelation makes a paint (coating composition) no longer usable for painting (coating) or, even if the paint is usable, there arise problems such as deteriorated performance of the resulting coating.
(Multifunctional Photocurable Compound)

The multifunctional photocurable compound (b) is a compound having two or more polymerizable unsaturated bonds per molecule, and a single species thereof may be used alone or two or more species thereof may be used in the form of a mixture. As examples of the multifunctional photocurable compound, a photocurable monomer (b1) and a photocurable oligomer (b2) can be mentioned. The use of such a multifunctional photocurable compound brings about characteristic effects of the present invention, i.e., improvements of appearance, chemical resistance, scratch resistance and packageability of the protective film.

As the photocurable monomer (b1), it is preferable to use a bifunctional or higher functional radically polymerizable unsaturated monomer having at least two polymerizable unsaturated bonds polymerizable by ultraviolet irradiation per molecule. The number of polymerizable unsaturated bonds contained in the radically polymerizable unsaturated monomer influences the appearance, chemical resistance, scratch resistance and packageability of the protective film. Even with the same blending amount, the monofunctional monomer having one polymerizable unsaturated bond per molecule tends to results in inferior appearance, chemical resistance, scratch resistance and packageability of the protective film, as compared to the case of using the polyfunctional monomer having two or more polymerizable unsaturated bonds per molecule. Therefore, from the viewpoint of improving the curability during the process of protective film formation, the appearance (gloss, etc.) and chemical resistance and the like of the protective film, the radically polymerizable unsaturated monomer is preferably a bi- or higher-functional monomer having 2 or more unsaturated bonds, more preferably a tetra- or higher functional monomer having 4 or more functional groups, and more preferably a penta- or higher-functional monomer having 5 or more functional groups. When the number of polymerizable unsaturated bonds contained in the radical polymerizable unsaturated monomer is too large, the curing shrinkage upon curing of the coating layer is increased, which is likely to result in a lower gloss of the protective film; therefore, the number of polymerizable unsaturated bonds is preferably 12 or less, and more preferably 5 to 9.

Specific examples of the polyfunctional radically polymerizable unsaturated monomer include the following.

Examples of the bifunctional radically polymerizable unsaturated monomer include ethylene glycol di(meth)acrylate, diethylene glycol di(meth)acrylate, polyethylene glycol di(meth)acrylate, propylene glycol di(meth)acrylate, dipropylene glycol di(meth)acrylate, polypropylene glycol di(meth)acrylate, neopentyl glycol di(meth)acrylate, 1,4-butanediol di(meth)acrylate, 1,6-hexanediol di(meth)acrylate, bisphenol A ethylene oxide-modified di(meth)acrylate, bisphenol A propylene oxide-modified di(meth)acrylate, 2-hydroxy-1-acryloxy-3-methacryloxypropane, and tricyclodecanedimethanol di(meth)acrylate.

Examples of the trifunctional radically polymerizable unsaturated monomer include trimethylolpropane tri(meth) acrylate, trimethylolpropane ethylene oxide-modified tri (meth)acrylate, trimethylolpropane propylene oxide-modified tri(meth)acrylate, glycerin tri(meth)acrylate, glycerin ethylene oxide-modified tri(meth)acrylate, glycerin propylene oxide-modified tri(meth)acrylate, pentaerythritol tri (meth)acrylate, propylene oxide-modified trimethylolpropane triacrylate, tris(2-hydroxyethyl)isocyanurate triacrylate, ethoxylated trimethylolpropane triacrylate, propoxylated trimethylolpropane triacrylate, and glycerin propoxy triacrylate.

Examples of the tetra- or higher-functional radically polymerizable unsaturated monomer include dipropylene glycol tetra(meth)acrylate, pentaerythritol tetra(meth)acrylate, pentaerythritol ethoxy tetraacrylate, ethylene oxide-modified pentaerythritol tetraacrylate, ditrimethylol propane tetraacrylate, dipentaerythritol pentaacrylate, and dipentaerythritol hexa(meth)acrylate.

Among the above-mentioned radically polymerizable unsaturated monomers, pentaerythritol tetraacrylate and dipentaerythritol hexaacrylate are preferable.

As the photocurable oligomer (b2), it is preferable to use a bi- or higher-functional radically polymerizable oligomer having at least two polymerizable unsaturated bonds polymerizable by ultraviolet irradiation per molecule. The photocurable oligomer is preferably tri- or higher-functional, more preferably hexa- or higher-functional from the viewpoint of improving the appearance and chemical resistance of the coating film. Incidentally, since excessive shrinkage of the coating film due to the crosslinking reaction leads to a decrease in adhesion, the photocurable oligomer is preferably dodeca- or lower-functional, and particularly preferably hexa- to nona-functional.

Examples of the photocurable oligomer include polyester (meth)acrylate, urethane (meth)acrylate, and epoxy (meth) acrylate. Among these oligomers, polyester acrylate and urethane acrylate are preferable in consideration of the high appearance, chemical resistance, etc. which are required of the protective film.

In the coating composition of the present invention, it is essential that the acrylic polyol resin (a) (component (a)) and the multifunctional photocurable compound (b) (component (b)) are blended in such amounts as would give a blending ratio, in terms of (a)/(b) mass ratio, of 5/95 to 90/10, since the component (a) has hydroxyl groups, and the component (b) has radically polymerizable unsaturated bonds. When the ratio of the component (a) is 5 or more, a protective film excellent in adhesion, chemical resistance, water resistance, packageability and recoatability can be obtained even when the curing shrinkage is increased by the crosslinking reaction. When the ratio of the component (a) is 90 or less, the chemical resistance and scratch resistance can be ensured, so that a coating composition satisfying the requirements on quality and productivity can be obtained. Here, the term "recoat" means to apply and cure a coating composition on a previously formed coating film to form a further coating film, and the term "recoatability" means an interlayer adhesion between the previously formed coating film and the later formed coating film.

The preferable blending ratio of the component (a) to the component (b) in the coating composition slightly varies depending on the use of the coating composition. For coating the surface of a plastic molded article (including a plastic molded article having a pre-formed coating layer formed by treating a surface of the plastic molded article by plating, vapor deposition or painting), a higher ratio of the component (a) tends to results in inferior chemical resistance and scratch resistance of the protective film, whereas a lower ratio of the component (a) tends to results in inferior adhesion, recoatability, environmental resistance (water resistance, moisture resistance, etc.); therefore, the (a)/(b) mass ratio is preferably from 5/95 to 70/30, more preferably from 30/70 to 70/30, and particularly preferably from 50/50 to 70/30. The same applies to the case of the aforementioned plastic molded article which already has a coating layer.

For coating the surface of a plastic molded article having on its surface a decorative layer formed by water pressure transfer, it is necessary to form a protective film having excellent adhesion to both the decorative layer and the surface of the plastic molded article. For simultaneously improving all of the recoatability, the chemical resistance and the packageability, it is essential that the (a)/(b) mass ratio is in the range of from 50/50 to 70/30, particularly preferably 55/45 to 65/35. In the case of the water pressure transfer coating composition, a lower blending ratio of the multifunctional photocurable compound (b) tends to result in loss of chemical resistance of the protective film due to insufficient crosslinking density.

(Photopolymerization Initiator)

As the photopolymerization initiator (c) used in the present invention, any known photopolymerization initiator can be appropriately used as long as it generates radicals by irradiation with ultraviolet rays, and the photopolymerization initiator (c) may be arbitrarily selected from those of a benzophenone type, a benzophenone type, a benzyl type, an acetophenone type, a quinone type, a thioxanthone type, a phenylglyoxylic acid type, and a phosphine oxide type.

Specific examples of the photopolymerization initiator include benzoin compounds such as benzoin, benzoin methyl ether, benzoin ethyl ether, benzoin isopropyl ether and benzoin isobutyl ether; benzophenone compounds such as benzophenone, p-methoxybenzophenone, o-benzoylbenzoic acid, methyl o-benzoylbenzoate, 4,4'-bis (dimethylamino)benzophenone and 4,4'-bis(diethylamino)benzophenone; benzyl compounds such as benzyl and 4,4'-dimethoxybenzyl; acetophenone compounds such as acetophenone, 2,2-diethoxyacetophenone, 2,2-dimethoxy-2-phenylacetophenone, 2,2-dimethoxy-1,2-diphenylethan-1-one, 1-hydroxycyclohexyl phenyl ketone, 2-hydroxy-2-methyl-1-phenylpropane-1-one; quinone compounds such as 2-ethylanthraquinone, 2-t-butylanthraquinone, 1,4-dimethylanthraquinone and camphorquinone; thioxanthone compounds such as thioxanthone, 2-methylthioxanthone, 2-isopropylthioxanthone, 2,4-dimethylthioxanthone, 2,4-diethylthioxanthone, and 2-chlorothioxanthone; phenylglyoxylic acid compounds such as methylphenyl glyoxylate, and ethylphenyl glyoxylate; phosphine oxide compounds such as bis(2,4,6-trimethylbenzoyl)phenylphosphine oxide, bis(2, 6-dimethoxybenzoyl)-2,4,4-trimethyl-pentylphosphine oxide, and 2,4,6-trimethylbenzoyl-diphenyl phosphine oxide. With respect to these compounds, one of the compounds may be used alone, or two or more of the compounds may be used in combination.

As the photopolymerization initiator (c), it is preferable to use a short wavelength initiator having a maximum absorption wavelength of shorter than 380 nm. For forming a protective film on a pre-formed coating layer or a decorative layer, it is preferred to at least two types of initiators in combination which include a short wavelength initiator (c1) having a maximum absorption wavelength of shorter than 380 nm, and a long wavelength initiator (c2) having a maximum absorption wavelength of 380 nm or longer, so as to sufficiently cure even the composition that has permeated into the pre-formed coating layer or the decorative layer. Since the decorative layer is colored with an ink, a sufficient amount of light may not reach into the decorative layer, which results in insufficient curing of the photocurable compound. However, the long wavelength initiator improves the light transmittance to the inside of the decorative layer so as to allow the curing reaction to proceed sufficiently. Further, the use of the long wavelength initiator in combination with the short wavelength initiator excellent in surface curability improves the curability of the protective film as a whole. Furthermore, the resin composition that has permeated into the decorative layer serving as the base of the protective film is sufficiently cured to become tough, whereby the adhesion of the protective film becomes satisfactory.

Examples of the long wavelength initiator include phosphine oxide polymerization initiators such as bis(2,4,6-trimethylbenzoyl)-phenylphosphine oxide, bis(2,6-dimethoxybenzoyl)-2,4,4-trimethyl-pentylphosphine oxide, and 2,4,6-trimethylbenzoyl-diphenylphosphine oxide.

The addition amount of the photopolymerization initiator is preferably 1.0 to 10.0% by mass, relative to the multifunctional photocurable compound (b). When the amount is less than 1.0% by mass, a sufficient curability may not be obtained, resulting in poor packageability. On the other hand, when the amount is more than 10.0% by mass, the presence of unreacted photopolymerization initiator may worsen the weatherability, which for example causes yellowing of the coating film. The amount is more preferably 2.0 to 5.0% by mass.

(Polyisocyanate Compound)

The polyisocyanate compound (d) used in the present invention is a compound which undergoes a crosslinking reaction with the hydroxyl group of the acrylic polyol resin (a), and has at least two free isocyanate groups per molecule. Examples thereof include aliphatic diisocyanates such as hexamethylene diisocyanate, trimethylhexamethylene diisocyanate, dimer acid diisocyanate and lysine diisocyanate; alicyclic diisocyanates such as hydrogenated xylylene diisocyanate, cyclohexylene diisocyanate, methylene bis(cyclohexyl isocyanate) and isophorone diisocyanate; aromatic diisocyanates such as tolylene diisocyanate, phenylene diisocyanate, 4,4'-diphenylmethane diisocyanate, xylylene diisocyanate, tetramethylxylylene diisocyanate and naphthalene diisocyanate; tri- or higher-functional organic polysocyanates such as 2-isocyanatoethyl-2,6-diisocyanatocaproate, 3-isocyanatomethyl-1,6-hexamethylene diisocyanate and 4-isocyanatomethyl-1,8-octamethylene diisocyanate; and modified products of these isocyanates. If necessary, an amine curing agent may be added to these polyisocyanate compounds.

Among the aforementioned polyisocyanate compounds, aliphatic polyisocyanates are preferable from the viewpoint of weatherability and workability, which also include modified products thereof.

Specific examples of the aliphatic polyisocyanate compound include Duranate 24A-100, Duranate TPA-100, and Duranate E402-90T, each manufactured by Asahi Kasei Corporation; Sumidur N-3300, Sumidur N-3200, and Sumidur N-75, each manufactured by Sumika Bayer Urethane Co., Ltd.; Coronate HX, and Coronate EH, each manufactured by Nippon Polyurethane Industry Co., Ltd.; and Takenate D-165N, manufactured by Mitsui Takeda Chemicals, Inc. "Duranate", "Sumidur", "Coronate" and "Takenate" are registered trademarks.

The blending ratio of the polyisocyanate compound (d) in the coating composition is determined in terms of a ratio of hydroxyl groups (—OH) contained in the acrylic polyol resin (a) to isocyanate groups (—NCO) contained in the polyisocyanate compound (d), i.e., an equivalence ratio (OH/NCO), and it is essential to blend the polyisocyanate compound such that the equivalence ratio is 0.5 to 1.5. When the equivalence ratio is 0.5 or more, a protective film having excellent adhesion can be obtained without causing deterioration of adhesion due to unreacted acrylic polyol resin. When the equivalence ratio is 1.5 or less, a curing defect due to unreacted isocyanate groups or an adhesion deterioration due to excessive shrinkage of the coating film are not caused. The equivalence ratio (OH/NCO) is more preferably 0.8 to 1.1, particularly preferably 0.9 to 1.1.

The polyisocyanate compound (d) may undergo a cross-linking reaction with the acrylic polyol resin (a) even at room temperature, and a higher temperature may induce a thermal polymerization of the polyisocyanate compound (d) with the acrylic polyol resin (a) or the multifunctional photocurable compound (b). Therefore, from the viewpoint of the pot life of the coating composition, it is preferable that a first liquid containing the acrylic polyol resin (a), the multifunctional photocurable compound (b) and the photo-polymerization initiator (c) and a second liquid containing the polyisocyanate compound (d) are separately provided, and when the coating is carried out, the first liquid and the second liquid are blended so as to give an equivalence ratio (OH/NCO) within the aforementioned range to obtain a coating composition to be applied.

The viscosity (according to the flow cup method prescribed in JIS K 5600-2-2) of the coating composition is 10 to 15 seconds, and preferably 11 to 14 seconds with Ford cup #4. When the viscosity is less than 10 seconds, a repelling phenomenon occurs on the decorative layer, and when an object to be coated is tilted, the so-called frame phenomenon may occur in which the applied coating composition flows outward from the center of the object so as to be unevenly distributed. On the other hand, when the viscosity is 15 seconds or more, the spray atomizability of the coating composition may be reduced and the wetting of the object to be coated may become insufficient, which results in loss of smoothness of the resulting coating. For these reasons, the viscosity within the aforementioned range is preferable. The tem "spray atomizability" means a property that a paint sprayed is distributed into uniform and fine droplets.

In the present invention, a solvent may be blended into the coating composition as an optional component for the purpose of adjusting the viscosity of the coating composition or the aforementioned first liquid and second liquid. The solvent also encompasses a polymerization solvent for the acrylic polyol resin (a). The blending amount of the solvent is not particularly limited, and it is preferable to determine the blending amount such that the coating composition to be prepared is easy to coat and the viscosity of each of the first liquid and the second liquid allows these liquids to be readily mixed. The method for addition of the solvent is not particularly limited.

Examples of the solvent include ester solvents such as ethyl acetate, propyl acetate, butyl acetate, methoxybutyl acetate, amyl acetate, methyl cellosolve acetate, cellosolve acetate, diethylene glycol monomethyl ether acetate, and carbitol acetate; ether solvents such as dioxane, ethylene glycol diethyl ether, and ethylene glycol dibutyl ether; ketone solvents such as acetone, methyl ethyl ketone, and methyl isobutyl ketone. As the solvent, a solvent commercially available from Exxon Mobil Corporation under the trade name of "Solvesso 150" or the like can also be used. With respect to these solvent, one of the solvents may be used alone, or two or more of the solvents may be used in combination. "Solvesso" is a registered trademark.

Here, if a solvent with strong solvent attack against the decorative layer formed by water pressure transfer (meaning that the solvent re-dissolves the print pattern layer constituting the decorative layer) is used, this may cause unfavorable phenomena such as deterioration of design of the decorative layer, lower smoothness of the surface of the coating film, and insufficient gloss of the protective film. Therefore, a solvent with lower solvent attack is preferable, and ethyl acetate, butyl acetate, butyl isoacetate, and Solvesso 150 are preferably used from this viewpoint.

Further, in the present invention, any additive for adjusting the light transmittance and color tone can be blended if necessary as long as the effects of the present invention are not impaired. Examples of the additive include pigments, plasticizers, reinforcing agents, photosensitizers, light stabilizers, chain transfer agents, ultraviolet absorbers, antioxidants, viscosity modifiers, tackifiers, foam stabilizers, anti-foaming agents, fungicides, and antiseptic agents. With respect to these additives, one of the additives may be used alone, or two or more of the additives may be used in combination as long as the effects of the present invention are not impaired.

The addition amount of the additive is preferably 0.01 to 10.0% by mass relative to the total amount (based on the mass of solids) of the components (a) and (b), and is more preferably from 0.1 to 5.0% by mass from the viewpoint of recoatability. In the case where the coating composition is composed of the first liquid and the second liquid which are separately provided, it is particularly preferable to add the additive to the first liquid into which the polyisocyanate compound has not been blended. This makes it possible to reduce the unevenness in composition of the components after mixing the first liquid and the second liquid and to easily adjust the characteristics of the protective film based on the blending ratio of the first liquid and the second liquid.

When the solvent is used in combination with a resin matting agent such as resin beads, it is preferred to add the solvent to the second liquid together with the polyisocyanate compound (d) and to add the resin matting agent to the first liquid, because the polyisocyanate compound is more likely to induce thermal polymerization with the component (a) and the component (b) during the high temperature storage.

Next, the water pressure transfer method using the heat- and light-curable coating composition for water pressure transfer will be described. The embodiments of the present invention will be described in detail with reference to the drawings. FIG. 1 schematically shows the water pressure transfer method using the water pressure transfer coating composition of the present invention. In this water pressure transfer method, a water pressure transfer film 20 composed of a water-soluble film (carrier film) 30 having a print pattern layer 40 formed thereon is floated on the surface of water 50 contained in a transfer tank such that the print pattern layer 40 with its adhesiveness recovered by an activator faces upward; and a transfer substrate 10 as a target of water pressure transfer is pushed into the water 50 in the transfer tank through the water pressure transfer film 20 to implement the water pressure transfer.

The water-soluble film 30 is made of a water-soluble material containing polyvinyl alcohol or the like as a main component that swells and softens by absorbing water. During the water pressure transfer, the water-soluble film 30 swells and softens by being in contact with the water 50 in the transfer tank, and remains to be attached to the transfer substrate to be decorated to thereby enable to implement the water pressure transfer. In the case of the general water pressure transfer, the print pattern layer 40 is previously formed on the water-soluble film 30 by an appropriate printing method such as gravure printing or flexographic printing, and is preserved to be in a dry solid state with its adhesiveness completely lost before implementing the water pressure transfer, because the water pressure transfer film is stored in the form of a roll or the like. The print pattern layer 40 includes not only a layer having a pattern in a strict sense but also a plain (non-patterned) print layer, a metal deposition film, a plating film, and a structure formed by any of these techniques and having a hologram effect.

Figure 2:
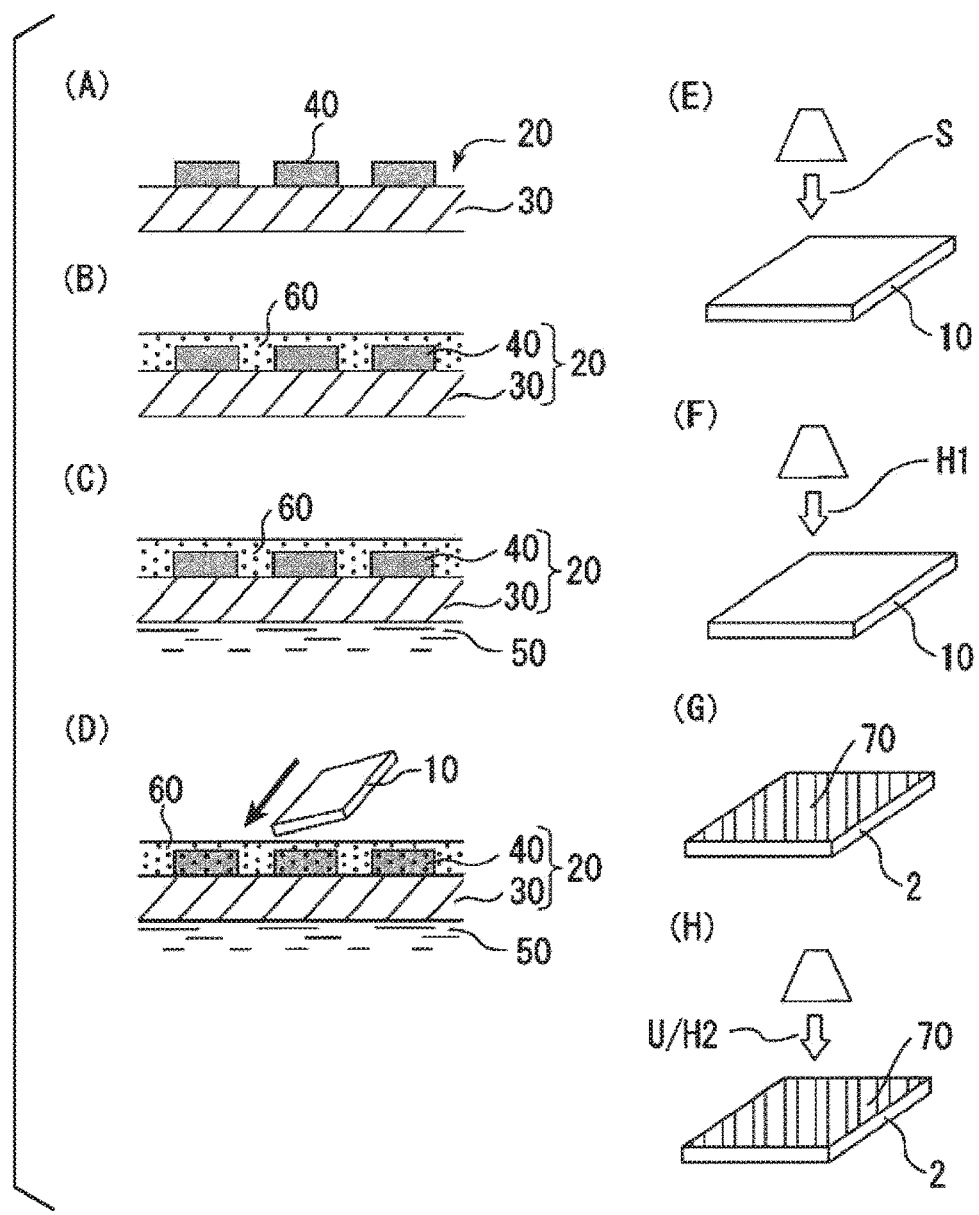
FIG. 2 is a process chart of the water pressure transfer method.
Figure 3:
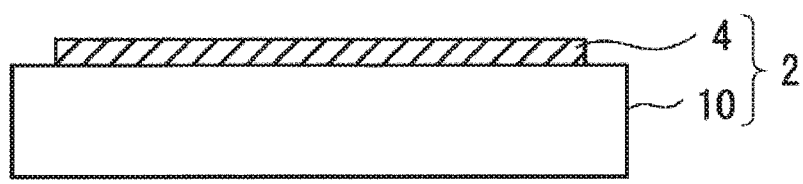
FIG. 3 is a configuration diagram of an article comprising a transfer substrate (molded article) and a decorative layer before forming a protective film.
Figure 4:
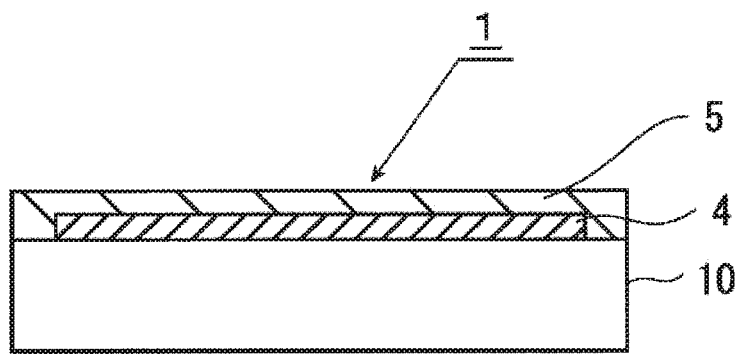
FIG. 4 is a configuration diagram of a decorated article comprising a transfer substrate (molded article), a decorative layer, and a protective film according to the Examples.

Hereinbelow, specific steps of the water pressure transfer method will be described with reference to FIG. 2. Before implementing the water pressure transfer onto the transfer substrate 10 (see FIG. 2A), a known solvent-based activator composition 60 is applied to the print pattern layer 40 of the water pressure transfer film 20 (see FIG. 2B), and this activator composition restores the adhesiveness (namely, revives the original adhesiveness) of the print pattern layer 40. Thus, the water pressure transfer film 20 having the print pattern layer 40 with its adhesiveness recovered by the activator composition 60 is transferred to the transfer substrate 10 by the water pressure transfer (see FIGS. 2C and 2D). Thereafter, as shown in FIG. 2E, the transfer substrate 10 is rinsed with a shower S or the like to remove the water-soluble film 30 (swelling-dissolving film layer) covering the upper surface of the print pattern layer 40 transferred to the transfer substrate 10. Then, as shown in FIG. 2F, the surface of the transfer substrate 10 is dried with hot air H1 to obtain a transfer article having a decorative layer 4 formed by transferring the print pattern layer 40 to the surface of the transfer substrate 10 (see FIG. 3). Subsequently, for protecting the decorative layer 4, the water pressure transfer coating composition of the present invention is applied to the decorative layer 4 (FIG. 2G: coating step) to form a coating layer 70, followed by curing the applied water pressure transfer coating composition by heating H2 and irradiation with ultraviolet rays U to form a protective film 5 covering the decorative layer 4 (FIG. 2H: curing step), thereby completing the water pressure transfer article 1 of the present invention a decorated article (see FIG. 4).

It is preferable to form the protective film 5 (see FIG. 4) so as to cover both the decorative layer 4 and the transfer substrate 10. In the curing step (FIG. 2H), the irradiation with ultraviolet rays can be performed using a known ultraviolet curing device including a light source such as a high pressure mercury lamp or a metal halide lamp, and an irradiator (lamp house). In the formation of the protective film 5, the coating layer 70 may be cured by simultaneously carrying out the heating and the ultraviolet irradiation, or by carrying out the heating and the ultraviolet irradiation one after the other; however, from the viewpoint of realizing a good appearance such as gloss, it is preferable to advance the curing first by heating, following by curing by irradiation with ultraviolet rays. It is also preferable to completely cure the coating film by curing by heating after the curing with ultraviolet irradiation depending on the degree of progress of thermal curing by heating before starting the curing with ultraviolet irradiation. Here, the heating before the curing with ultraviolet irradiation is referred to as preliminary heating, and the heating after the curing with ultraviolet irradiation is referred to as main heating. When the curing with ultraviolet irradiation is performed while a volatile component such as a solvent is present in the uncured coating film, the protective film after curing may be clouded to become white turbid (whitened). Therefore, before irradiation with ultraviolet rays, a desolvation treatment is preferably performed to volatilize and remove the solvent component by heating, and it is more preferred to implement the desolvation treatment by the preliminary heating. The simultaneous implementation of the thermal curing reaction the desolvation treatment by this preliminary heating may also bring about an effect of improving the smoothness of the cured protective film. Further, a decompression treatment may be carried out as an alternative means of desolvation treatment. The heating temperatures in the preliminary heating and the main heating are set depending on the heat resistance of the transfer substrate and the components of the decorative layer (ink component and the like); however, in the water pressure transfer, the temperature in both cases is preferably 90° C. or less, and more preferably 80° C. or less. For example, the curing is performed under the following conditions. The curing is performed by preliminary heating at 80° C. for 5 minutes, then by irradiation with ultraviolet rays with cumulative light amount of 1,000 mJ/cm$^2$, and finally by main heating at 80° C. for 10 minutes to complete the curing process to form the protective film 5. This curing step is usually carried out in air, but may be carried out in an inert gas atmosphere as necessary.

Here, in the curing step, it is important that the water pressure transfer coating composition applied in the coating step permeates into the decorative layer and is cured at least while being in contact with the surface of the transfer substrate. The curing in this state makes it possible to obtain a protective film having excellent adhesion to the transfer substrate and the decorative layer. Therefore, the water pressure transfer coating composition of the present invention is configured to be able to permeate suitably into the decorative layer. As to how to at least bring the coating composition into contact with the surface of the transfer substrate or to allow the coating composition to permeate into the transfer substrate, it can be implemented by adjusting the time elapsed after applying the coating composition on the decorative layer. However, in the case where the design deteriorates due to dissolution of the decorative layer or the like with the passage of long period of time, this problem can be avoided by curing the coating composition while adjusting the time after the application such that both of the required design and adhesion can be achieved. In the case where the decorative layer is a metal deposition film, the decorative layer is formed with fine cracks in the metal deposition film due to extension caused by swelling of the water-soluble film in the step of water pressure transfer (FIGS. 2(c) to 2(d)); therefore, the water pressure transfer coating composition permeates into the fine cracks to come into contact with the surface of the transfer substrate.

As the coating method in the coating step, any of known methods such as spray coating, brush coating, roller coating, dipping coating, electrodeposition coating and the like can be employed, but the spray coating is preferable since excellent appearance can be easily achieved. The dipping coating is also referred to as dip coating, which is a coating method in which an object to be coated is dipped in a coating composition and then is drawn out therefrom.

Regarding the thickness of the coating layer formed in the coating step, it is preferable that the thickness of the coating film after curing is 10 to 50 μm, and more preferably 20 to 40 μm. When the thickness of the coating film after curing is less than 10 μm, the thick appearance cannot be obtained and, hence, a satisfactory design cannot be obtained, which is not favorable. On the other hand, when the coating layer is formed such that the thickness of the coating film after curing exceeds 50 μm, problems such as sagging and foaming are likely to occur, which is also not preferable. The term "foaming" means bubble-like surface defects on the surface of the coating film, and is a phenomenon where the solvent remaining inside the coating layer is evaporated by heating at the time of baking or the like to generate bubbles inside the coating film, which deform the surface of the cured coating film to appear as bubble-like defects. The term "sagging" is a phenomenon where a coating composition flows due to the inclination of an object being coated or the like after application of the coating composition until the coating composition is dried and cured, resulting in formation of a coating film having locally large thickness.

The coating film forming method, in which the coating composition of the present invention is applied to the surface of a plastic molded article or a coated plastic molded article having a coating layer, corresponds to the coating step (FIG. 2G) and the subsequent steps in the water pressure transfer method using the water pressure transfer coating composition of the present invention. Specific preliminary curing and post-curing conditions are as follows: at 65 to 90° C. for 5 to 30 minutes in total, preferably at 70 to 90° C. for 10 to 20 minutes in total. When the curing is pre-formed by drying at a temperature of lower than 65° C. for 5 to 30 minutes, the crosslinking density decreases, and the adhesion, chemical resistance and packageability deteriorate as well, which is not preferable because a longer drying time is necessary. On the other hand, when the temperature exceeds 90° C., the plastic substrate such as ABS resin may be deformed.

The plastic molded article is preferably a molded article obtained by molding at least one type of thermoplastic resin selected from polypropylene, polycarbonate, polymethyl methacrylate, polybutylene terephthalate, polyamide and a styrene-acrylic copolymer. Examples of the plating applied to the surface of the plastic molded article include chromium plating, zinc plating, cadmium plating, tin plating, nickel plating, gold plating, silver plating, copper plating, platinum plating, and a plating of an alloy thereof. Examples of the deposited film applied to the surface of the plastic molded article include films formed by deposition of aluminum, tin, indium and the like. The coating film to be formed in advance on the surface of the plastic molded article by painting is not particularly limited as long as it is an ordinary undercoat layer. The coating film forming method of the present invention is not restricted by the thickness of the coating formed in advance on the surface of any of these plastic molded articles.

EXAMPLES

Hereinbelow, the present invention will be described with reference to Examples and Comparative Examples which, however, should not be construed as limiting the present invention.

Component (a): Acrylic Polyol Resin (Production Examples 1 to 11)

100 g of butyl acetate was charged into a 1-liter four-necked flask equipped with a stirrer, a cooler, a nitrogen charger, a thermometer and a monomer dropping device, followed by heating with stirring until the internal temperature reached 110° C. Then, a mixed solution containing monomer components of types and amounts (g) shown in Table 1 and a polymerization initiator (2,2-azobis(2-methylbutyronitrile; ABN-E) was added dropwise to the flask over 90 minutes. After completion of the dropwise addition, the resulting mixture was kept at 110° C. for 2 hours, whereafter the reaction was terminated to obtain a solution of an acrylic polyol resin. Table 1 shows the composition of the mixed solution and the glass transition temperature, hydroxyl value and mass average molecular weight of the obtained copolymer.

TABLE 1

| | | Production Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Monomer | Methyl methacrylate | 55.5 | 51.5 | 51.5 | 48.5 | 38.5 | 61.5 | 59.5 | 68.0 | 61.0 | | 48.5 |
| | n-butyl methacrylate | 27.0 | 33.0 | 33.0 | 35.0 | | | 32.0 | | 32.5 | 17.0 | 35.0 |
| | n-butyl acrylate | | | | | 39.0 | 27.0 | | | | | |
| | 2-hydroxyethyl methacrylate | 16.0 | 14.0 | 14.0 | | | | | 10.0 | 5.0 | 46.0 | |
| | 2-hydroxyethyl acrylate | | | | 15.0 | 21.0 | 10.0 | 7.0 | | | | 15.0 |
| | Methacrylic acid | 1.0 | 1.0 | 1.0 | 1.0 | 1.0 | 1.0 | 1.0 | 1.0 | 1.0 | 1.0 | 1.0 |
| | 2-(dimethylamino)ethyl methacrylate | 0.5 | 0.5 | 0.5 | 0.5 | 0.5 | 0.5 | 0.5 | 0.5 | 0.5 | 0.5 | 0.5 |
| | Tert-butyl methacrylate | | | | | | | | 20.5 | | 35.5 | |
| Total | | 100.0 | 100.0 | 100.0 | 100.0 | 100.0 | 100.0 | 100.0 | 100.0 | 100.0 | 100.0 | 100.0 |
| Polymerization initiator | ABN-E | 6 | 7.5 | 10 | 6 | 6 | 3 | 0.8 | 6 | 4 | 6 | 2 |
| Reaction product (acrylic polyol) | | a-1 | a-2 | a-3 | a-4 | a-5 | a-6 | a-7 | a-8 | a-9 | a-10 | a-11 |
| Properties | Glass transition temp.(° C.) | 70 | 65 | 60 | 50 | 0 | 30 | 63 | 100 | 70 | 65 | 50 |
| | Hydroxyl value (mg-KOH/g) | 70 | 60 | 60 | 70 | 100 | 50 | 30 | 43 | 20 | 200 | 70 |
| | Mass average molecular weight | 7,000 | 5,000 | 2,000 | 7,000 | 7,000 | 18,000 | 60,000 | 7,000 | 12,000 | 7,000 | 20,000 |

The compounds used as the components (b) to (d) and other components are as specified in Table 2.

TABLE 2

| Category | Sign | Product name etc. | Characteristics |
|---|---|---|---|
| Photocurable monomer | b-1 | Dipentaerythritol hexaacrylate | 6-functional acrylate monomer Mw: 578 |
| | b-2 | Pentaerythritol tetraacrylate | 4-functional acrylate monomer Mw: 352 |
| | b-3 | Tricyclodecanedimethanol diacrylate | 2-functional acrylate monomer Mw: 304 |
| | b-4 | Isobornyl acrylate | 1-functional acrylate monomer Mw: 208 |
| Photocurable oligomer | b-5 | "Aronix M8030(*)" (mfd. by Toagosei Co., Ltd.) | 3-functional polyester acrylate Mw: 400 |
| | b-6 | "Unidic V4019W" (mfd. by DIC Corporation) | 6-functional polyurethane acrylate Mw: 1000 |
| | b-7 | "Miramer MU9800(*)" (mfd. by Miwon Co., Ltd.) | 9-functional polyurethane acrylate Mw: 1000 |
| Photopolymerization initiator | c-1 | "Irgacure 184(*)" (mfd. by Chiba Japan Co., Ltd.) | 1-hydroxycyclohexyl phenyl ketone |
| | c-2 | | Benzophenone |
| | c-3 | "Irgacure 819(*)" (mfd. by Chiba Japan Co., Ltd.) | Bis(2,4,6-trimethylbenzoyl)-phenylphosphine oxide |
| Polyisocyanate compound | d | "Sumidur N-3300(*)" (mfd. by Sumika Bayer Urethane Co., Ltd.) | Aliphatic HDI polyisocyanate NCO concentration 21.6% by mass |
| UV absorber | — | "Tinuvin 400(*)" (mfd. by Chiba Japan Co., Ltd.) | Hydroxyphenyltriazine-type UV absorber |
| Hindered amine photostabilizer | — | "Tinuvin 292(*)" (mfd. by Chiba Japan Co., Ltd.) | Bis(1,2,2,6,6-pentamethyl-4-piperidyl) sebacate |
| Leveling agent | — | "BYK-3550(*)" (mfd. by BYK-Chemie GmbH) | Surface conditioner containing polysiloxane modified polyacrylate as a main component |
| Solvent | BAC | | Butyl acetate |

(*)Each being a registered trademark.

After diluting each of the acrylic polyol resins obtained in Production Examples 1 to 11 with a diluting solvent (butyl acetate) in an amount as shown in Table 3 or Table 4, a photocurable monomer or a photocurable oligomer in an amount as shown in Table 3 or Table 4 and a photopolymerization initiator were added to obtain a first liquid. Further, the polyisocyanate compound in an amount as shown in Table 3 or Table 4 was diluted with a diluting solvent (butyl acetate) to obtain a second liquid. The first liquid and the second liquid were mixed to prepare a coating composition. The unit for the numbers indicating the amounts of components in Tables 3 and 4 is % by mass.

Examples 1 to 15, Comparative Examples 1 to 9

In each of the Examples and Comparative Examples, a protective film was formed on the surface of a plastic molded article having a decorative layer obtained by water pressure transfer of a print pattern layer of a water pressure transfer film using the below-described water pressure transfer film, activator composition, and transfer substrate, and the performances of the obtained protective film were evaluated.

(1) Water Pressure Transfer Film

As the water pressure transfer film, "G5100 Trust Walnut 4C" supplied by Taika Corporation to the licensees was used. This water pressure transfer film is formed of a polyvinyl alcohol (PVA) film with a grain pattern-printed pattern layer (from which the solvent component has been removed by evaporation) formed on its transfer target surface by gravure printing using a solvent-based ink composed of a mixed system of a pigment and a synthetic resin.

(2) Activator Composition and Coating Conditions

In each of the Examples and the Comparative Examples of the present invention, as the activator composition, "CPA-H" (product name) manufactured by Taika Corporation was used, and this activator composition was applied on the print pattern layer of the water pressure transfer film of item (1) above so as to give a thickness of 10 μm by the Mayer rod method.

(3) Transfer Substrate

A flat plate made of ABS resin (TM20, manufactured by UMG Co., Ltd.) having a size of 100 mm×200 mm×3 mm was used as a transfer substrate as a transfer target.

(Preparation of Transfer Article and Formation of Protective Film with Water Pressure Transfer Coating Composition)

Immediately before introducing the transfer film into the transfer tank, the activator composition was applied onto the print pattern layer of the water pressure transfer film by the Miya rod coating method, and then the water pressure transfer film was floated on the surface of water in the transfer tank such that the surface not coated with the activator composition was in contact with the water surface. When the water pressure transfer film had reached a predetermined state of being extended and activated, the transfer substrate was pushed into the water through the water pressure transfer film to transfer the print pattern layer of the water pressure transfer film to the surface of the transfer substrate, thereby forming a decorative layer. Then, the transfer substrate was taken out from the water, washed with water and dried to obtain a transfer article.

In each of the Examples and the Comparative Examples, the coating composition was applied to the whole of the decorative layer side surface of the transfer article by spray coating so as to form a coating film having a film thickness of 25±5 μm. Next, with the coating composition having permeated into the decorative layer and reached the surface of the transfer substrate (5 minutes after coating), a preliminary heating was performed at an ambient temperature of 80° C. for 5 minutes, followed by curing with irradiation of ultraviolet rays of an integrated light amount of 1,000 mJ/cm². Then, a main heating was performed at an ambient temperature of 80° C. for 10 minutes to further cure the coating composition, thereby forming a protective film.

The performances of the protective film formed of the water pressure transfer coating composition were evaluated by the following methods.

(1) Gloss: The 60° gloss of the coating film was measured using a gloss meter (micro-TRI-gloss, manufactured by BYK-Gardner GmbH) and evaluated according to the following criteria.

[Evaluation Criteria for Gloss]
Good: 60° gloss is 90 or more.
Average: 60° gloss is 80 to less than 90.
Poor: 60° gloss is less than 80.

(2) Adhesion: The adhesion was evaluated after allowing the formed protective film to stand at room temperature (average ambient temperature of 23° C.) for 72 hours, according to the following criteria. Using a CELLOTAPE (registered trademark) (manufactured by Nichiban Co., Ltd.), the adhesion was evaluated by observing the peeled state for each specimen in the cross cut test in accordance with old version of JIS K 5400-8.5.

[Evaluation Criteria for Adhesion]
Good: No peeling occurred (practically usable)
Poor: Peeling occurred (inappropriate for practical use)

(3) Oleic Acid Resistance: A protective film was formed and allowed to stand at room temperature (average ambient temperature of 23° C.) for 72 hours. Then, 0.2 mL of a 5% oleic acid solution (solvent: benzene) was dropped to the protective film. The adhesion and the change of surface condition of the protective film after allowing the film to stand at an ambient temperature of 80° C. for 24 hours were evaluated by visual observation in accordance with the above evaluation criteria (2) and (3). Of the results of above evaluations of the adhesion and the change of surface condition by visual observation, the worse one was taken as the evaluation result of the oleic acid resistance.

[Evaluation Criteria for Changes in Surface Condition by Visual Observation]
Good: No change (practically usable)
Poor: Wrinkles and/or blisters occurred (inappropriate for practical use)

(4) Lactic Acid Resistance: A protective film was formed and allowed to stand at room temperature (average ambient temperature of 23° C.) for 72 hours. Then, 0.2 mL of a 5% lactic acid solution (solvent: purified water) was dropped to the protective film, and the film was allowed to stand at an ambient temperature of 80° C. for 2 hours. Then, the adhesion and the change of surface condition of the protective film were evaluated by visual observation in accordance with the above evaluation criteria (2) and (3). Of the results of above evaluations of the adhesion and the change of surface condition by visual observation, the worse one was taken as the evaluation result of the lactic acid resistance.

(5) Sunscreen cream resistance: A protective film was formed and allowed to stand at room temperature (average ambient temperature of 23° C.) for 72 hours. Then, 2 g of sunscreen cream (Copatone UV cut milk SPF 50, manufactured by Taisho Pharmaceutical Co., Ltd.) to an area of approximately 100 mm×100 mm on the protective film, and the film was allowed to stand at an ambient temperature of 70° C. for 4 hours. Then, the sunscreen cream was washed off with water and the water was wiped away, whereafter the adhesion and the change of surface condition of the protective film were evaluated by visual observation in accordance with the above evaluation criteria (2) and (3). Of the results of above evaluations of the adhesion and the change of surface condition by visual observation, the worse one was taken as the evaluation result of the sunscreen cream resistance. "Copper tone" is a registered trademark.

(6) Moisture Resistance Test: A protective film was formed and allowed to stand at room temperature (average ambient temperature of 23° C.) for 72 hours. Then, the film was allowed to stand at an ambient temperature of 40° C. and an ambient humidity of 95% RH for 240 hours, whereafter the adhesion was evaluated in accordance with the above evaluation criteria (2).

(7) Water resistance test: A protective film was formed and allowed to stand at room temperature (average ambient temperature of 23° C.) for 72 hours, and then immersed in warm water of 35° C. for 120 hours, whereafter the adhesion was evaluated according to the above evaluation criteria (2).

(8) Packageability: A protective film was formed and allowed to stand at room temperature (average ambient temperature of 23° C.) for 1 hour. Then, an anti-migration test was performed and the change in surface condition of the protective film was evaluated by visual observation in accordance with the following evaluation criteria. The anti-migration test was performed as follows: a 50 mm×50 mm mirror mat (Miramat manufactured by JSP Corporation) was placed on and in direct contact with the protective film, and a 50 mm×50 mm ABS plate (2 mm thick) was placed thereon, and a weight of 500 g was further placed thereon, whereafter the protective film was allowed to stand at room temperature (average ambient temperature of 23° C.) for 10 hours. "Miramat" is a registered trademark.

[Evaluation Criteria for Changes in Surface Condition by Visual Observation]
Good: No change (practically usable)
Poor: Distinct mark left (inappropriate for practical use)

(9) Scratch Resistance: A protective film was formed and allowed to stand at room temperature (average ambient temperature of 23° C.) for 72 hours. Then, the protective film was abrased by reciprocating the film under 21.6 N for 50 times in a Gakushin-Type rubbing tester to which a rubbing block with glass beads attached thereto (area 20×20 mm) was adhered. Thereafter, the change in 60° gloss value before and after the abrasion was determined with a gloss meter (micro-TRI-gloss, manufactured by BYK-Gardner GmbH). Further, the color difference before and after the abrasion was determined with a color difference meter (model: CR-300, manufactured by Konica Minolta Inc.). The results were evaluated according to the following evaluation criteria. Here, the change in lightness was adopted for evaluation of the color difference.

[Evaluation Criteria for Scratch Resistance]
Good: Gloss value change of less than 150%, lightness change of less than 0.5 (practically usable)
Average: Gloss value change of from 150% to less than 180%, lightness change of 0.5 to less than 1.0 (practically usable)

Poor: Gloss value change of 180% or more, lightness change of 1.0 or more (inappropriate for practical use)

(10) Recoatability: The water pressure transfer product produced in a manner as described in each of the Examples and the Comparative Examples was allowed to stand at room temperature (average ambient temperature 23° C.) for 7 days. Then, on the formed protective film, a further protective film was formed using the same water pressure transfer coating composition as used in each of the Examples or the Comparative Examples in the same manner as in each of the Exampled or the Comparative Examples. The resulting water pressure transfer product was allowed to stand at room temperature (average ambient temperature of 23° C.) for 2 days, whereafter the adhesion test was conducted and the results were evaluated according to the above evaluation criteria (2).

The results of the evaluations of the protective film are shown in Table 3.

TABLE 3

| | Components (Part by mass) | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|---|---|---|---|---|
| 1st liquid | Acrylic polyol resin (a-1) | 50 | 70 | | | | 60 | | | 50 | | | | | 50 |
| | Acrylic polyol resin (a-2) | | | 50 | | | | 60 | | | | | | | |
| | Acrylic polyol resin (a-3) | | | | 50 | | | | 70 | | | | | | |
| | Acrylic polyol resin (a-4) | | | | | 50 | | | | | | | | | |
| | Acrylic polyol resin (a-5) | | | | | | | | | | | | | | |
| | Acrylic polyol resin (a-6) | | | | | | | | | | | | | | |
| | Acrylic polyol resin (a-7) | | | | | | | | | | | | | | |
| | Acrylic polyol resin (a-8) | | | | | | | | | | 50 | | | | |
| | Acrylic polyol resin (a-9) | | | | | | | | | | | 50 | | | |
| | Acrylic polyol resin (a-10) | | | | | | | | | | | | 50 | | |
| | Acrylic polyol resin (a-11) | | | | | | | | | | | | | 50 | |
| | Photocurable monomer (b-1) | 50 | 30 | 50 | | | | | | 50 | 50 | 50 | 50 | 50 | 50 |
| | Photocurable monomer (b-2) | | | | 50 | | | | | | | | | | |
| | Photocurable monomer (b-3) | | | | | 50 | | | | | | | | | |
| | Photocurable monomer (b-4) | | | | | | | | | | | | | | |
| | Photocurable oligomer (b-5) | | | | | | | | 30 | | | | | | |
| | Photocurable oligomer (b-6) | | | | | | | 40 | | | | | | | |
| | Photocurable oligomer (b-7) | | | | | | 40 | | | | | | | | |
| | Photopolymerization initiator (c-1) | 0.5 | 0.5 | 0.5 | 0.5 | 0.5 | 0.5 | 0.5 | 0.5 | 2.2 | 0.5 | 0.5 | 0.5 | 0.5 | 0.5 |
| | Photopolymerization initiator (c-2) | 1.4 | 1.4 | 1.4 | 1.4 | 1.4 | 1.4 | 1.4 | 1.4 | | 1.4 | 1.4 | 1.4 | 1.4 | 1.4 |
| | Photopolymerization initiator (c-3) | 0.3 | 0.3 | 0.3 | 0.3 | 0.3 | 0.3 | 0.3 | 0.3 | | 0.3 | 0.3 | 0.3 | 0.3 | 0.3 |
| | Ultraviolet absorber | 0.8 | 0.8 | 0.8 | 0.8 | 0.8 | 0.8 | 0.8 | 0.8 | 0.8 | 0.8 | 0.8 | 0.8 | 0.8 | 0.8 |
| | Hindered amine photostabilizer | 0.4 | 0.4 | 0.4 | 0.4 | 0.4 | 0.4 | 0.4 | 0.4 | 0.4 | 0.4 | 0.4 | 0.4 | 0.4 | 0.4 |
| | Leveling agent | 0.2 | 0.2 | 0.2 | 0.2 | 0.2 | 0.2 | 0.2 | 0.2 | 0.2 | 0.2 | 0.2 | 0.2 | 0.2 | 0.2 |
| | Solvent (BAC) | 30 | 30 | 30 | 30 | 30 | 30 | 30 | 30 | 30 | 30 | 30 | 30 | 30 | 30 |
| 2nd liquid | Polyisocyanate (d) | 9.1 | 12.7 | 7.8 | 7.8 | 9.1 | 10.9 | 9.36 | 10.9 | 9.1 | 5.59 | 2.6 | 26 | 9.1 | 4.55 |
| | Solvent (BAC) | 11.1 | 15.6 | 9.53 | 9.53 | 11.1 | 13.3 | 11.4 | 13.3 | 11.1 | 6.83 | 4.43 | 44.3 | 11.1 | 5.56 |
| Conditions | Equivalence ratio (OH/NCO) | 1 | 1 | 1 | 1 | 1 | 1 | 1 | 1 | 1 | 1 | 1 | 1 | 1 | 0.5 |
| | (a)/(b) | 50/50 | 70/30 | 50/50 | 50/50 | 50/50 | 60/40 | 60/40 | 70/30 | 50/50 | 50/50 | 50/50 | 50/50 | 50/50 | 50/50 |
| Results of performance tests | Gloss | Good | Good | Good | Good | Good | Good | Good | Good | Good | Good | Good | Good | Good | Good |
| | Adhesion | Good | Good | Good | Good | Good | Good | Good | Good | Good | Good | Good | Good | Good | Good |
| | Oleic acid resistance | Good | Good | Good | Good | Good | Good | Good | Good | Good | Good | Good | Good | Good | Good |
| | Lactic acid resistance | Good | Good | Good | Good | Good | Good | Good | Good | Good | Good | Good | Good | Good | Good |
| | Sunscreen cream resistance | Good | Good | Good | Good | Good | Good | Good | Good | Good | Good | Good | Good | Good | Good |
| | Moisture resistance | Good | Good | Good | Good | Good | Good | Good | Good | Good | Good | Good | Good | Good | Good |
| | Water resistance | Good | Good | Good | Good | Good | Good | Good | Good | Good | Good | Good | Good | Good | Good |
| | Packageability | Good | Good | Good | Good | Good | Good | Good | Good | Good | Good | Good | Good | Good | Good |
| | Scratch resistance | Good | Good | Good | Good | Good | Good | Good | Good | Good | Good | Good | Good | Good | Good |
| | Recoatability | Good | Good | Good | Good | Good | Good | Good | Good | Good | Good | Good | Good | Good | Good |

| | Components (Part by mass) | Ex. 15 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|---|
| 1st liquid | Acrylic polyol resin (a-1) | 50 | 10 | 30 | 90 | 5 | | | | 2 | 95 |
| | Acrylic polyol resin (a-2) | | | | | | | | | | |
| | Acrylic polyol resin (a-3) | | | | | | | | | | |
| | Acrylic polyol resin (a-4) | | | | | | | | | | |
| | Acrylic polyol resin (a-5) | | | | | | 50 | | | | |
| | Acrylic polyol resin (a-6) | | | | | | | 50 | | | |
| | Acrylic polyol resin (a-7) | | | | | | | | 50 | | |
| | Acrylic polyol resin (a-8) | | | | | | | | | | |
| | Acrylic polyol resin (a-9) | | | | | | | | | | |
| | Acrylic polyol resin (a-10) | | | | | | | | | | |
| | Acrylic polyol resin (a-11) | | | | | | | | | | |
| | Photocurable monomer (b-1) | 50 | 90 | 70 | 10 | | 50 | | 50 | 98 | 5 |
| | Photocurable monomer (b-2) | | | | | | | 50 | | | |
| | Photocurable monomer (b-3) | | | | | 95 | | | | | |
| | Photocurable monomer (b-4) | | | | | | | | 50 | | |
| | Photocurable oligomer (b-5) | | | | | | | | | | |
| | Photocurable oligomer (b-6) | | | | | | | | | | |
| | Photocurable oligomer (b-7) | | | | | | | | | | |

TABLE 3-continued

|  | Components | | | | | | | | | | |
|---|---|---|---|---|---|---|---|---|---|---|---|
|  | Photopolymerization initiator (c-1) | 0.5 | 0.5 | 0.5 | 0.5 | 0.5 | 0.5 | 0.5 | 0.5 | 0.5 | 0.5 |
|  | Photopolymerization initiator (c-2) | 1.4 | 1.4 | 1.4 | 1.4 | 1.4 | 1.4 | 1.4 | 1.4 | 1.4 | 1.4 |
|  | Photopolymerization initiator (c-3) | 0.3 | 0.3 | 0.3 | 0.3 | 0.3 | 0.3 | 0.3 | 0.3 | 0.3 | 0.3 |
|  | Ultraviolet absorber | 0.8 | 0.8 | 0.8 | 0.8 | 0.8 | 0.8 | 0.8 | 0.8 | 0.8 | 0.8 |
|  | Hindered amine photostabilizer | 0.4 | 0.4 | 0.4 | 0.4 | 0.4 | 0.4 | 0.4 | 0.4 | 0.4 | 0.4 |
|  | Leveling agent | 0.2 | 0.2 | 0.2 | 0.2 | 0.2 | 0.2 | 0.2 | 0.2 | 0.2 | 0.2 |
|  | Solvent (BAC) | 30 | 30 | 30 | 30 | 30 | 30 | 30 | 30 | 30 | 30 |
| 2nd liquid | Polyisocyanate (d) | 13.7 | 1.82 | 5.46 | 16.4 | 0.91 | 12 | 6.5 | 3.9 | 0.36 | 17.3 |
|  | Solvent (BAC) | 16.7 | 2.22 | 6.67 | 20 | 1.11 | 15.9 | 7.94 | 4.76 | 0.44 | 21.1 |
| Conditions | Equivalence ratio (OH/NCO) | 1.5 | 1 | 1 | 1 | 1 | 1 | 1 | 1 | 1 | 1 |
|  | (a)/(b) | 50/50 | 10/90 | 30/70 | 90/10 | 5/95 | 50/50 | 50/50 | 50/50 | 2/98 | 95/5 |
| Results of performance tests | Gloss | Good | Poor | Poor | Good | Poor | Good | Good | Poor | Poor | Good |
|  | Adhesion | Good | Good | Good | Good | Good | Good | Good | Good | Poor | Good |
|  | Oleic acid resistance | Good | Good | Good | Poor | Good | Poor | Poor | Poor | Good | Poor |
|  | Lactic acid resistance | Good | Good | Good | Poor | Good | Poor | Poor | Poor | Good | Poor |
|  | Sunscreen cream resistance | Good | Good | Good | Poor | Good | Good | Good | Poor | Good | Poor |
|  | Moisture resistance | Good | Good | Good | Good | Good | Good | Good | Good | Poor | Good |
|  | Water resistance | Good | Good | Good | Good | Good | Good | Good | Good | Poor | Good |
|  | Packageability | Good | Good | Good | Good | Good | Poor | Good | Good | Good | Poor |
|  | Scratch resistance | Good | Good | Good | Poor | Average | Good | Good | Poor | Good | Poor |
|  | Recoatability | Good | Good | Good | Good | Good | Good | Good | Good | Poor | Good |

From the results shown in Table 3, it can be understood that the protective films of the Examples, each containing an acrylic polyol resin having a glass transition temperature of 50° C. or higher, a photocurable monomer or a photocurable oligomer, a polyisocyanate compound and a photopolymerization initiator within a specific blending ratio, have excellent appearance (gloss and the like) and are excellent not only in chemical resistance, scratch resistance and environmental resistance (water resistance, moisture resistance, etc.), but also in packageability and adhesion to a plastic molded article. By contrast, it can be understood that the intended purpose cannot be achieved with the protective films formed using the water pressure transfer coating compositions obtained in Comparative Examples 5 and 6 in which the acrylic polyol resins a-5 and a-6 each having a glass transition temperature of less than 50° C. were respectively blended, in Comparative Example 7 in which the acrylic polyol resin a-7 having a mass average molecular weight of greater than 20,000 is blended, and in Comparative Examples 1 to 4, 8 and 9 in which the blending ratios of the acrylic polyol resin and the photocurable monomer fell outside the specific range.

Examples 16 to 34, Comparative Examples 10 to 14

In the Examples and the Comparative Examples, the coating composition of each of the Examples and the Comparative Examples was spray-coated on the surface of an ABS resin molded article so as to form a coating layer with a thickness after curing of 25±5 μm. Next, a preliminary curing was performed by heating at an ambient temperature of 80° C. for 5 minutes, followed by ultraviolet irradiation with a cumulative radiation dose of 1,000 mJ/cm², and the resulting was further cured by heating at an ambient temperature of 80° C. for 10 minutes to form a coating film.

The performances of the above film were evaluated by the aforementioned methods.

The results of the evaluations of the coating film are shown in Table 4.

TABLE 4

|  | Components (Part by mass) | Ex. 16 | Ex. 17 | Ex. 18 | Ex. 19 | Ex. 20 | Ex. 21 | Ex. 22 | Ex. 23 | Ex. 24 | Ex. 25 | Ex. 26 | Ex. 27 | Ex. 28 | Ex. 29 |
|---|---|---|---|---|---|---|---|---|---|---|---|---|---|---|---|
| 1st liquid | Acrylic polyol resin (a-1) | 10 | 30 | 50 | 70 | 90 |  |  |  | 60 |  |  | 5 | 50 |  |
|  | Acrylic polyol resin (a-2) |  |  |  |  |  | 50 |  |  |  | 60 |  |  |  |  |
|  | Acrylic polyol resin (a-3) |  |  |  |  |  |  | 50 |  |  |  | 70 |  |  |  |
|  | Acrylic polyol resin (a-4) |  |  |  |  |  |  |  | 50 |  |  |  |  |  |  |
|  | Acrylic polyol resin (a-5) |  |  |  |  |  |  |  |  |  |  |  |  |  |  |
|  | Acrylic polyol resin (a-6) |  |  |  |  |  |  |  |  |  |  |  |  |  |  |
|  | Acrylic polyol resin (a-7) |  |  |  |  |  |  |  |  |  |  |  |  |  |  |
|  | Acrylic polyol resin (a-8) |  |  |  |  |  |  |  |  |  |  |  |  |  | 50 |
|  | Acrylic polyol resin (a-9) |  |  |  |  |  |  |  |  |  |  |  |  |  |  |
|  | Acrylic polyol resin (a-10) |  |  |  |  |  |  |  |  |  |  |  |  |  |  |
|  | Acrylic polyol resin (a-11) |  |  |  |  |  |  |  |  |  |  |  |  |  |  |
|  | Photocurable monomer (b-1) | 90 | 70 | 50 | 30 | 10 | 50 |  |  |  |  |  |  | 50 | 50 |
|  | Photocurable monomer (b-2) |  |  |  |  |  |  | 50 |  |  |  |  | 95 |  |  |
|  | Photocurable monomer (b-3) |  |  |  |  |  |  |  | 50 |  |  |  |  |  |  |
|  | Photocurable monomer (b-4) |  |  |  |  |  |  |  |  |  |  |  |  |  |  |
|  | Photocurable oligomer (b-5) |  |  |  |  |  |  |  |  |  |  | 30 |  |  |  |
|  | Photocurable oligomer (b-6) |  |  |  |  |  |  |  |  |  | 40 |  |  |  |  |
|  | Photocurable oligomer (b-7) |  |  |  |  |  |  |  |  | 40 |  |  |  |  |  |
|  | Photopolymerization initiator (c-1) | 0.5 | 0.5 | 0.5 | 0.5 | 0.5 | 0.5 | 0.5 | 0.5 | 0.5 | 0.5 | 0.5 | 0.5 | 2.2 | 0.5 |

TABLE 4-continued

| | Components (Part by mass) | | | | | | | | | | | | | | |
|---|---|---|---|---|---|---|---|---|---|---|---|---|---|---|---|
| | Photopolymerization initiator (c-2) | 1.4 | 1.4 | 1.4 | 1.4 | 1.4 | 1.4 | 1.4 | 1.4 | 1.4 | 1.4 | 1.4 | 1.4 | 1.4 | 1.4 |
| | Photopolymerization initiator (c-3) | 0.3 | 0.3 | 0.3 | 0.3 | 0.3 | 0.3 | 0.3 | 0.3 | 0.3 | 0.3 | 0.3 | 0.3 | 0.3 | 0.3 |
| | Ultraviolet absorber | 0.8 | 0.8 | 0.8 | 0.8 | 0.8 | 0.8 | 0.8 | 0.8 | 0.8 | 0.8 | 0.8 | 0.8 | 0.8 | 0.8 |
| | Hindered amine photostabilizer | 0.4 | 0.4 | 0.4 | 0.4 | 0.4 | 0.4 | 0.4 | 0.4 | 0.4 | 0.4 | 0.4 | 0.4 | 0.4 | 0.4 |
| | Leveling agent | 0.2 | 0.2 | 0.2 | 0.2 | 0.2 | 0.2 | 0.2 | 0.2 | 0.2 | 0.2 | 0.2 | 0.2 | 0.2 | 0.2 |
| | Solvent (BAC) | 30 | 30 | 30 | 30 | 30 | 30 | 30 | 30 | 30 | 30 | 30 | 30 | 30 | 30 |
| 2nd liquid | Polyisocyanate (d) | 1.82 | 5.46 | 9.1 | 12.7 | 16.37 | 7.8 | 7.8 | 9.1 | 10.9 | 9.36 | 10.9 | 0.91 | 9.1 | 5.59 |
| | Solvent (BAC) | 2.22 | 6.67 | 11.1 | 15.6 | 20.01 | 9.53 | 9.53 | 11.1 | 13.3 | 11.4 | 13.3 | 1.11 | 11.1 | 6.83 |
| Conditions | Equivalence ratio (OH/NCO) | 1 | 1 | 1 | 1 | 1 | 1 | 1 | 1 | 1 | 1 | 1 | 1 | 1 | 1 |
| | (a)/(b) | 10/90 | 30/70 | 50/50 | 70/30 | 90/10 | 50/50 | 50/50 | 50/50 | 60/40 | 60/40 | 70/30 | 5/95 | 50/50 | 50/50 |
| Results of performance tests | Gloss | Good | Good | Good | Good | Good | Good | Good | Good | Good | Good | Good | Good | Good | Good |
| | Adhesion | Good | Good | Good | Good | Good | Good | Good | Good | Good | Good | Good | Good | Good | Good |
| | Oleic acid resistance | Good | Good | Good | Good | Good | Good | Good | Good | Good | Good | Good | Good | Good | Good |
| | Lactic acid resistance | Good | Good | Good | Good | Good | Good | Good | Good | Good | Good | Good | Good | Good | Good |
| | Sunscreen cream resistance | Good | Good | Good | Good | Good | Good | Good | Good | Good | Good | Good | Good | Good | Good |
| | Moisture resistance | Good | Good | Good | Good | Good | Good | Good | Good | Good | Good | Good | Good | Good | Good |
| | Water resistance | Good | Good | Good | Good | Good | Good | Good | Good | Good | Good | Good | Good | Good | Good |
| | Packageability | Good | Good | Good | Good | Good | Good | Good | Good | Good | Good | Good | Good | Good | Good |
| | Scratch resistance | Good | Good | Good | Good | Average | Good | Good | Good | Good | Good | Good | Average | Good | Good |
| | Recoatability | Good | Good | Good | Good | Good | Good | Good | Good | Good | Good | Good | Good | Good | Good |

| | Components (Part by mass) | Ex. 30 | Ex. 31 | Ex. 32 | Ex. 33 | Ex. 34 | Comp. Ex. 10 | Comp. Ex. 11 | Comp. Ex. 12 | Comp. Ex. 13 | Comp. Ex. 14 |
|---|---|---|---|---|---|---|---|---|---|---|---|
| 1st liquid | Acrylic polyol resin (a-1) | | | | 50 | 50 | | | | 2 | 95 |
| | Acrylic polyol resin (a-2) | | | | | | | | | | |
| | Acrylic polyol resin (a-3) | | | | | | | | | | |
| | Acrylic polyol resin (a-4) | | | | | | | | | | |
| | Acrylic polyol resin (a-5) | | | | | | 50 | | | | |
| | Acrylic polyol resin (a-6) | | | | | | | 50 | | | |
| | Acrylic polyol resin (a-7) | | | | | | | | 50 | | |
| | Acrylic polyol resin (a-8) | | | | | | | | | | |
| | Acrylic polyol resin (a-9) | 50 | | | | | | | | | |
| | Acrylic polyol resin (a-10) | | 50 | | | | | | | | |
| | Acrylic polyol resin (a-11) | | | 50 | | | | | | | |
| | Photocurable monomer (b-1) | 50 | 50 | 50 | 50 | 50 | 50 | | | 98 | 5 |
| | Photocurable monomer (b-2) | | | | | | | 50 | | | |
| | Photocurable monomer (b-3) | | | | | | | | | | |
| | Photocurable monomer (b-4) | | | | | | | | 50 | | |
| | Photocurable oligomer (b-5) | | | | | | | | | | |
| | Photocurable oligomer (b-6) | | | | | | | | | | |
| | Photocurable oligomer (b-7) | | | | | | | | | | |
| | Photopolymerization initiator (c-1) | 0.5 | 0.5 | 0.5 | 0.5 | 0.5 | 0.5 | 0.5 | 0.5 | 0.5 | 0.5 |
| | Photopolymerization initiator (c-2) | 1.4 | 1.4 | 1.4 | 1.4 | 1.4 | 1.4 | 1.4 | 1.4 | 1.4 | 1.4 |
| | Photopolymerization initiator (c-3) | 0.3 | 0.3 | 0.3 | 0.3 | 0.3 | 0.3 | 0.3 | 0.3 | 0.3 | 0.3 |
| | Ultraviolet absorber | 0.8 | 0.8 | 0.8 | 0.8 | 0.8 | 0.8 | 0.8 | 0.8 | 0.8 | 0.8 |
| | Hindered amine photostabilizer | 0.4 | 0.4 | 0.4 | 0.4 | 0.4 | 0.4 | 0.4 | 0.4 | 0.4 | 0.4 |
| | Leveling agent | 0.2 | 0.2 | 0.2 | 0.2 | 0.2 | 0.2 | 0.2 | 0.2 | 0.2 | 0.2 |
| | Solvent (BAC) | 30 | 30 | 30 | 30 | 30 | 30 | 30 | 30 | 30 | 30 |
| 2nd liquid | Polyisocyanate (d) | 2.6 | 26 | 9.1 | 4.55 | 13.7 | 12 | 6.5 | 3.9 | 0.36 | 17.3 |
| | Solvent (BAC) | 4.43 | 44.3 | 11.1 | 5.56 | 16.7 | 15.9 | 7.94 | 4.76 | 0.44 | 21.1 |
| Conditions | Equivalence ratio (OH/NCO) | 1 | 1 | 1 | 0.5 | 1.5 | 1 | 1 | 1 | 1 | 1 |
| | (a)/(b) | 50/50 | 50/50 | 50/50 | 50/50 | 50/50 | 50/50 | 50/50 | 50/50 | 2/98 | 95/5 |
| Results of performance tests | Gloss | Good | Poor | Poor | Good | Good | Good | Good | Poor | Good | Good |
| | Adhesion | Good | Good | Good | Good | Good | Good | Good | Good | Poor | Good |
| | Oleic acid resistance | Good | Good | Good | Poor | Poor | Poor | Poor | Poor | Good | Poor |
| | Lactic acid resistance | Good | Good | Good | Poor | Poor | Poor | Poor | Poor | Good | Poor |
| | Sunscreen cream resistance | Good | Good | Good | Good | Good | Good | Good | Poor | Good | Poor |
| | Moisture resistance | Good | Good | Good | Good | Good | Good | Good | Good | Poor | Good |
| | Water resistance | Good | Good | Good | Good | Good | Good | Good | Good | Poor | Good |
| | Packageability | Good | Good | Good | Poor | Good | Good | Poor | Good | Good | Poor |
| | Scratch resistance | Good | Good | Good | Good | Good | Good | Good | Poor | Good | Poor |
| | Recoatability | Good | Good | Good | Good | Good | Good | Good | Good | Poor | Good |

From the results shown in Table 4, it can be understood that the coating films of the Examples, each containing an acrylic polyol resin having a high glass transition temperature, a photocurable monomer or a photocurable oligomer, a polyisocyanate compound and a photopolymerization initiator within a specific blending ratio, exhibit excellent performances. By contrast, it can be understood that the intended purpose cannot be achieved with the coating films formed using the coating compositions obtained in Comparative Examples 10 and 11 in which the acrylic polyol resins each having a low glass transition temperature were respectively blended, in Comparative Example 12 in which the acrylic polyol resin having a large mass average molecular weight is blended, and in Comparative Examples 13 and 14 in which the blending ratios of the acrylic polyol resin and the photocurable monomer fell outside the specific range.

INDUSTRIAL APPLICABILITY

The heat- and light-curable coating composition of the present invention not only can provide a protective film which is excellent in appearance, adhesion, various excellent protective performances such as scratch resistance, environmental resistance (water resistance, moisture resistance, etc.) and chemical resistance, and packageability, but also has excellent recoatability; therefore, the coating composition of the present invention is advantageous in productivity as well and has an improved industrial applicability.

DESCRIPTION OF THE REFERENCE SIGNS

1 Water pressure transfer article (article having a protective film formed thereon)
2 Transfer target article (substrate having a decorative layer formed thereon)
4 Decorative layer
5 Protective layer
10 Transfer substrate
20 Water pressure transfer film
30 Water-soluble film (carrier film)
40 Print pattern layer
50 Water
60 Activator composition
70 Coating layer of water pressure transfer coating composition
S Shower
H1 Hot air
H2 Heat
U Light (ultraviolet rays)

What is claimed:

1. A heat- and light-curable coating composition for water pressure transfer, which is for protecting a decorative layer formed on a surface of a transfer substrate by water pressure transfer of a print pattern printed and dried on a water soluble film and for protecting the surface of said transfer substrate, which comprises:
an acrylic polyol resin (a), a multifunctional photocurable compound (b), a photopolymerization initiator (c), and an aliphatic polyisocyanate compound (d),
said acrylic polyol resin (a) having a glass transition temperature (Tg) of 50° C. to 100° C., a mass average molecular weight of 1,000 to 20,000 in terms of polystyrene, and a hydroxyl value of 20 to 80 mgKOH/g,
said multifunctional photocurable compound (b) being a compound having two or more polymerizable unsaturated bonds per molecule,
a ratio of said acrylic polyol resin (a) to said multifunctional photocurable compound (b) being 50/50 to 70/30 in terms of a mass ratio (a)/(b), and
an equivalence ratio of hydroxyl groups (—OH) contained in the acrylic polyol resin (a) to isocyanate groups (—NCO) contained in the aliphatic polyisocyanate compound (d), (OH/NCO), is 0.5 to 1.5.

2. The heat- and light-curable coating composition for water pressure transfer according to claim 1, wherein the acrylic polyol resin (a) is a copolymer of: a hydroxyl group-containing acrylic monomer (a1) having at least one hydroxyl group and at least one polymerizable unsaturated bond per molecule; and at least one type of a monomer (a2) selected from the group consisting of an acrylic monomer and a styrenic monomer, each having a polymerizable unsaturated bond and having no hydroxyl group.

3. The heat- and light-curable coating composition for water pressure transfer according to claim 1, wherein the multifunctional photocurable compound (b) is pentaerythritol tetraacrylate or dipentaerythritol hexaacrylate.

4. The heat- and light-curable coating composition for water pressure transfer according to claim 1, wherein the photopolymerization initiator (c) comprises at least two types of initiators including a short wavelength initiator (c1) having a maximum absorption wavelength of shorter than 380 nm, and a long wavelength initiator (c2) having a maximum absorption wavelength of 380 nm or longer.

5. The heat- and light-curable coating composition for water pressure transfer according to claim 1, which is a mixture of a first liquid containing the acrylic polyol resin (a), the multifunctional photocurable compound (b) and the photopolymerization initiator (c) with a second liquid containing the aliphatic polyisocyanate compound (d).

6. The heat- and light-curable coating composition for water pressure transfer according to claim 1, which further comprises a solvent (e) for viscosity adjustment.

7. A water pressure transfer method comprising forming a decorative layer on a surface of a transfer substrate by water pressure transfer of a print pattern layer of a water pressure transfer film having said print pattern layer printed and dried on a water soluble film, followed by coating and curing the heat- and light-curable coating composition of claim 1 on the decorative layer to form a protective film.

8. The water pressure transfer method according to claim 7, wherein the protective film is formed by: applying the heat- and light-curable coating composition water pressure transfer on the decorative layer to form a coating layer; heating the coating layer while the heat- and light-curable water pressure transfer coating composition having permeated through the decorative layer contacts at least the surface of the transfer substrate; and curing the heat- and light-curable coating composition for water pressure transfer by ultraviolet irradiation.

9. The water pressure transfer method according to claim 7, wherein the acrylic polyol resin (a) is a copolymer of: a hydroxyl group-containing acrylic monomer (a1) having at least one hydroxyl group and at least one polymerizable unsaturated bond per molecule thereof; and at least one type of a monomer (a2) selected from the group consisting of an acrylic monomer and a styrenic monomer, each having a polymerizable unsaturated bond and having no hydroxyl group.

10. The water pressure transfer method according to claim 7, wherein the multifunctional photocurable compound (b) is pentaerythritol tetraacrylate or dipentaerythritol hexaacrylate.

11. The water pressure transfer method according to claim 7, wherein the photopolymerization initiator (c) comprises at least two types of initiators including a short wavelength initiator (c1) having a maximum absorption wavelength of shorter than 380 nm, and a long wavelength initiator (c2) having a maximum absorption wavelength of 380 nm or longer.

12. The water pressure transfer method according to claim 7, wherein the coating composition is a mixture of a first liquid containing the acrylic polyol resin (a), the multifunctional photocurable compound (b) and the photopolymerization initiator (c) with a second liquid containing the polyisocyanate compound (d).

13. The water pressure transfer method according to claim 7, wherein said coating composition further comprises a solvent (e) for viscosity adjustment.

14. A water pressure transfer article obtained by the water pressure transfer method of claim 7.

15. The heat- and light-curable coating composition for water pressure transfer according to claim 1, wherein the multifunctional photocurable compound (b) is selected from the group consisting of dipentaerythritol pentaacrylate, and dipentaerythritol hexa(meth)acrylate.

16. The heat- and light-curable coating composition for water pressure transfer according to claim 1, wherein the multifunctional photocurable compound (b) is a nona-functional urethane acrylate.

17. The heat- and light-curable coating composition for water pressure transfer according to claim 1, wherein said multifunctional photocurable compound (b) is a compound selected from the group consisting of a multifunctional (meth)acrylate having 5 to 9 polymerizable unsaturated bonds per molecule, a multifunctional polyester acrylate having 6 to 9 polymerizable unsaturated bonds per molecule, and a multifunctional urethane acrylate having 6 to 9 polymerizable unsaturated bonds per molecule.

* * * * *

UNITED STATES PATENT AND TRADEMARK OFFICE
CERTIFICATE OF CORRECTION

PATENT NO. : 10,759,960 B2
APPLICATION NO. : 15/501289
DATED : September 1, 2020
INVENTOR(S) : Tomoyuki Jingu et al.

It is certified that error appears in the above-identified patent and that said Letters Patent is hereby corrected as shown below:

On the Title Page

Line 3 of Item (73), delete "Yokyo" and insert --Tokyo-- therefor.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*